United States Patent [19]

Ogawara et al.

[11] Patent Number: 5,655,069
[45] Date of Patent: Aug. 5, 1997

[54] APPARATUS HAVING A PLURALITY OF PROGRAMMABLE LOGIC PROCESSING UNITS FOR SELF-REPAIR

[75] Inventors: Hideki Ogawara; Hiroshi Furukawa, both of Kawasaki, Japan

[73] Assignee: Fujitsu Limited, Kawasaki, Japan

[21] Appl. No.: 693,540

[22] Filed: Aug. 7, 1996

Related U.S. Application Data

[63] Continuation of Ser. No. 436,525, May 8, 1995, abandoned

[30] Foreign Application Priority Data

Jul. 29, 1994 [JP] Japan .................. 6-178846

[51] Int. Cl.⁶ .................................................. G06F 11/00
[52] U.S. Cl. ..................... 395/182.08; 395/182.01
[58] Field of Search ........................... 395/182.08, 182.09, 395/182.11, 183.03, 182.2, 182.01

[56] References Cited

U.S. PATENT DOCUMENTS

| | | | |
|---|---|---|---|
| 4,358,823 | 11/1982 | McDonald et al. | 395/575 |
| 4,610,013 | 9/1986 | Long et al. | 371/9 |
| 4,823,256 | 4/1989 | Bishop et al. | 395/575 |
| 4,907,228 | 3/1990 | Bruckert et al. | 371/68.3 |
| 5,202,980 | 4/1993 | Morita et al. | 395/575 |
| 5,291,494 | 3/1994 | Bruckert et al. | 371/11.3 |
| 5,313,386 | 5/1994 | Cook et al. | 364/187 |
| 5,325,517 | 6/1994 | Baker et al. | 395/575 |
| 5,379,418 | 1/1995 | Shimazaki et al. | 395/575 |

FOREIGN PATENT DOCUMENTS

| | | |
|---|---|---|
| 55-24452 | 2/1980 | Japan . |
| 4-7751 | 1/1992 | Japan . |

*Primary Examiner*—Robert W. Beausoliel, Jr.
*Assistant Examiner*—Norman M. Wright
*Attorney, Agent, or Firm*—Staas & Halsey

[57] ABSTRACT

An information processing apparatus with programmable function and self-repair function which can deal with multiple troubles the information processing apparatus includes a logic processing unit formed of logic forming elements for realizing a predetermined function; spare logic processing units that can be reconfigured of logic forming elements to reproduce the predetermined function of the logic processing unit; a data holding unit for holding forming data in the logic processing unit; a fault detecting unit for detecting a fault occurrence in the logic processing unit; and a reconfiguring unit for reconfiguring the spare logic processing unit having a logic circuit configuration similar to the logic processing unit, based on configuration data read out of the data holding unit, when the fault detecting unit detects a fault occurrence. The information processing apparatus can automatically reconfigure the system to reproduce its original normal function of a faulty forming element.

28 Claims, 31 Drawing Sheets

□ LOGIC CELL
■ FAULT LOGIC CELL
--- SCAN PATH
— CIRCUIT PATH

□ LOGIC CELL
■ FAULT LOGIC CELL
--- SCAN PATH
— CIRCUIT PATH

FIG. 7

| ITEM | COORDINATE (x,y) | FUNCTION | STATUS |
|---|---|---|---|
| 1 | (1,1) | TYPE 1 | USABLE |
| 2 | (1,2) | TYPE 3 | DISABLED |
| 3 | (1,3) | TYPE 2 | USABLE |
| ⋮ | ⋮ | | |
| N | (X,Y) | | SPARE |

25A

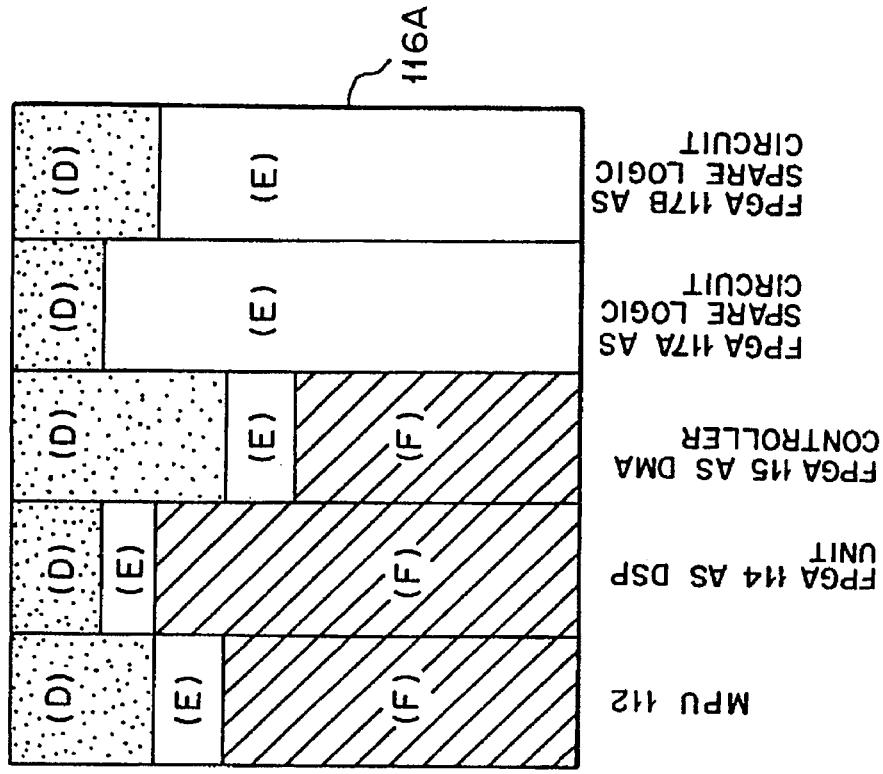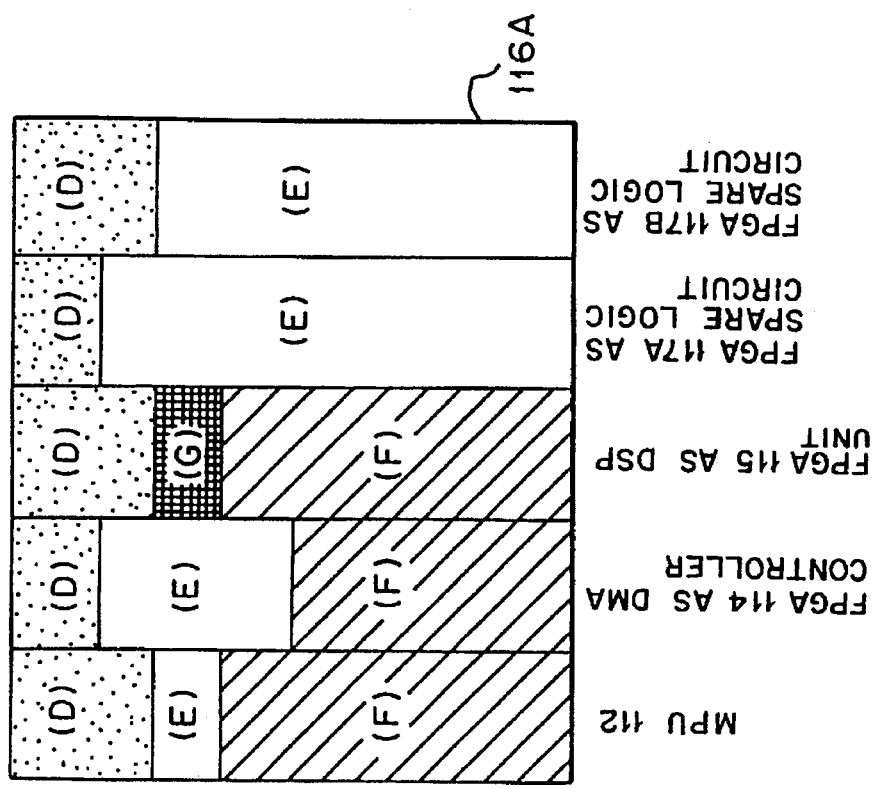

FIG. 12

| FPGA | FIRST TABLE - NUMBER OF USABLE LOGIC CELLS | | SECOND TABLE - FUNCTION OF STRUCTURAL CIRCUIT | NUMBER OF LOGIC CELLS NEEDED |
|---|---|---|---|---|
| 114 | 9000 | COMPARISON | DSP UNIT | 8000 |
| 117A | 9000 | COMPARISON | MPU | 6000 |
| 115 | 7000 | COMPARISON | DMA CONTROLLER | 5000 |
| 117B | 7000 | COMPARISON | SPARE LOGIC CIRCUIT | 0 |
| 112 | 5000 | COMPARISON | SPARE LOGIC CIRCUIT | 0 |

IS NUMBER OF CELLS IN THE TABLE 1 MORE THAN THAT IN THE TABLE 2 IN EACH ITEM ?

☐: RECONSTRUCTIBLE LOGIC CELL

APPARATUS HAVING A PLURALITY OF PROGRAMMABLE LOGIC PROCESSING UNITS FOR SELF-REPAIR

This application is a continuation of application Ser. No. 08/436,525, filed May 8, 1995, now abandoned.

BACKGROUND OF THE INVENTION

1) Field of the Invention

The present invention relates to a programmable information processing apparatus (e.g. logic modules, integrated circuits, units, information processors, and computing systems), and more particularly to an information processing apparatus with a self-repair function.

2) Description of the Related Art

Recently, there has been a demand to increase the reliability of information processing systems. In response, highly-reliable information processing systems that can recover, by themselves, after a trouble occurrence, without depending on an operator, have been proposed.

Some such information processing apparatuses have a self-repair function, by which, even if trouble occurs in hardware, the system can be recovered by separating the fault portion or operating the substitutive circuit, without stopping the operation of the entire system and asking for assistance.

A system that uses multiplexing building blocks (forming elements) and selects the backup system when a trouble occurs in the main system, is shown in FIG. 31.

The information processing system with self-repair function, shown in FIG. 31, is a typical highly-reliable information processing apparatus forming, for example, a non-stop computer. Referring to FIG. 31, numeral 201 represents a CPU board, 202 represents a LAN board, and 203 represents a line board. These blocks, each formed on a printed board, are multiplexed by plural printed board units.

The printed board units, each formed of plural integrated circuits, function respectively as the CPU board 201, the LAN board 202, and the line board 203.

Numeral 204 represents a back plane board which interconnects the CPU boards 201, the LAN boards 202, and the line boards 203. The numeral 205 represents a LAN transceiver, 206 represents a line switcher, and 207 represents a network connected to the line switcher 206.

In the information processing apparatus with self-repair function shown in FIG. 31, when a specific printed board unit, among the multiplexed printed board units, malfunctions, the operation of the printed board unit is stopped to operate the spare printed board unit, whereby the entire system continues its operation.

When a line board 203 experiences trouble during operation, it is stopped and the line switch 206 operates to select a spare line board 203, thus continuing the operation of the entire system. However, even if a single integrated circuit, acting as a component (forming element) in the system, is broken, the entire system must be replaced, requiring a servicing system and a backup system. The entire system is large in size and high priced.

Where the system operation is switched from the servicing system to the backup system, because of trouble or fault of the servicing system, the servicing system must be manually repaired or parts must be replaced during the successive operation of the backup system. Hence the first system cannot function when the backup system is troubled during the repair of the servicing system (multiple troubles).

This self-repair-type information processing system does not require the replacement of the entire system in the case of an integrated circuit broken. However, each printed board unit must be entirely multiplexed. Hence requiring a large sized system.

Another type of system is one in which a fault portion is replaced with a spare member in small unit, as typified by substantive memories arranged in memory circuits or substantive sector regions prepared in magnetic disk units. This system has an advantage in that the spare member can be miniaturized. However, since the spare member is a specific portion having the memory function of a memory or magnetic disk, other portions with no memory functions troubled cannot be replaced.

Particularly, as to a system used within an artificial satellite orbiting in the outer space, it is almost impossible to replace and repair externally fault parts. It is desirable to facilitate repair internally by the system itself as much as possible. However, the first and second systems have a limited ability to self-repair. A local fault results in a complete replacement of each system or unit, even if the remaining components are alive. Hence many normal components in the system cannot be utilized at all.

SUMMARY OF THE INVENTION

The present invention is made to overcome the above-mentioned problems. An object of the present invention is to provide an information processing apparatus with a self-repair function that can automatically reconfigure the system to reproduce the original normal function of a faulty component, including any type of trouble therein. The information processing apparatus can deal with multiple troubles and facilitates a system of small in size and at low price.

In order to achieve the above objects, according to the present invention, the information processing apparatus with self-repair function is characterized by a logic processing unit formed as a logic circuit for realizing a predetermined function, the logic function formed of plural logic forming elements; at least one of spare logic processing units that can be reconfigured as a logic circuit formed of plural logic forming elements to reproduce the predetermined function of the logic processing unit; data holding means for holding logic circuit forming data in the logic processing unit; fault detecting means for detecting a fault occurrence in the logic processing unit; and reconfiguring means for reading the logic circuit forming data regarding a fault logic processing unit out of the data holding means when the fault detecting means detects a fault occurrence in the logic processing unit and for reconfiguring the plural logic forming elements included in the spare logic processing unit, based on the logic circuit forming data, so as to be a logic circuit similar to the fault logic processing unit.

According to the present invention, the information processing apparatus with self-repair function includes a logic processing unit, a spare logic processing unit, data holding means, fault detecting means, and reconfiguring means. Hence the reconfiguration can be automatically made by recovering the original, normal function against various faults of forming elements included in the information processing apparatus. Hence there is an advantage in that the information processing apparatus can cope with multiple troubles and can be down-sized with its low price.

The information with self-repair function is characterized by a logic processing unit formed as a logic circuit for realizing a predetermined function, the logic function formed of plural logic forming elements; plural spare logic processing elements that are not used in a normal time; data holding means for holding logic circuit forming data in the logic processing unit; fault detecting means for detecting a fault occurrence in the logic processing unit; fault logic element diagnosis means for diagnosing a logic forming element related to the fault factor occurring in the fault logic processing unit; reconfiguring means for reading the logic circuit forming data regarding the fault logic processing unit out of the data holding means when the fault detecting means detects a fault occurrence in the logic processing unit and for calculating reconfiguration data, based on the logic circuit forming data, to reconfigure the same function as that of said fault logic processing unit, using the spare logic forming element as well as the remaining logic forming elements, except the fault logic forming element diagnosed by the fault logic element diagnosis means; and reconfiguring means for reconfiguring the logic processing unit using the spare logic forming elements and the remaining spare logic forming elements except the fault logic forming element diagnosed by the fault logic element diagnosis means, based on the reconfiguration data calculated by the reconfiguration data computing means, so as to have the same function as that of the fault logic processing unit.

Therefore, according to the present invention, the information processing apparatus with self-repair function includes a logic processing unit, spare logic forming elements, data holding means, fault logic element diagnosis means, reconfiguration data computing means, and reconfiguring means. The reconfiguration can be automatically made by recovering the original, normal function against various faults of forming elements included in the information processing apparatus. Hence there is an advantage in that the information processing apparatus can cope with multi;

BRIEF DESCRIPTION OF THE DRAWINGS

FIG. 7 is a diagram showing the logic cell table in a memory according to the first embodiment of the present invention;

FIG. 10(a) is a diagram showing the ratio of the number of usable logic cells to the number of disabled logic cells;

FIG. 10(b) is a diagram showing the ratio of the number of usable logic cells to the number of disabled logic cells;

FIG. 12 is a diagram showing the first table and the second table, each prepared by means of a MPU;

DESCRIPTION OF THE PREFERRED EMBODIMENTS

(a) The Aspect of the Invention

Referring to the attached drawings, explanation will be made as for an aspect of the present invention.

Figure 1A:
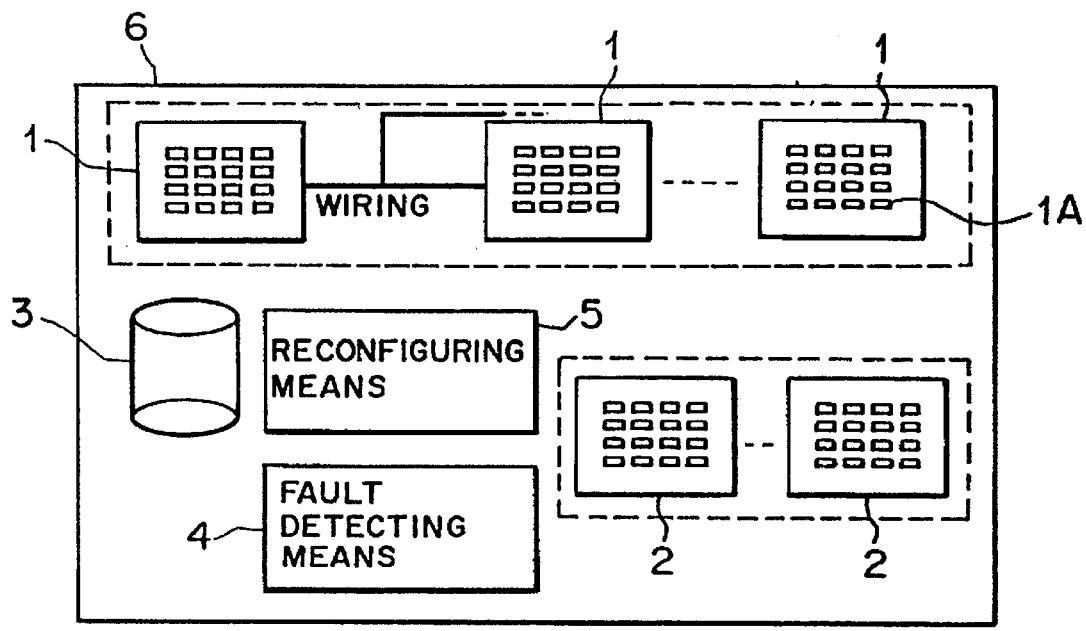
FIG. 1(a) is a block diagram showing a first aspect of the present invention.
Figure 1B:
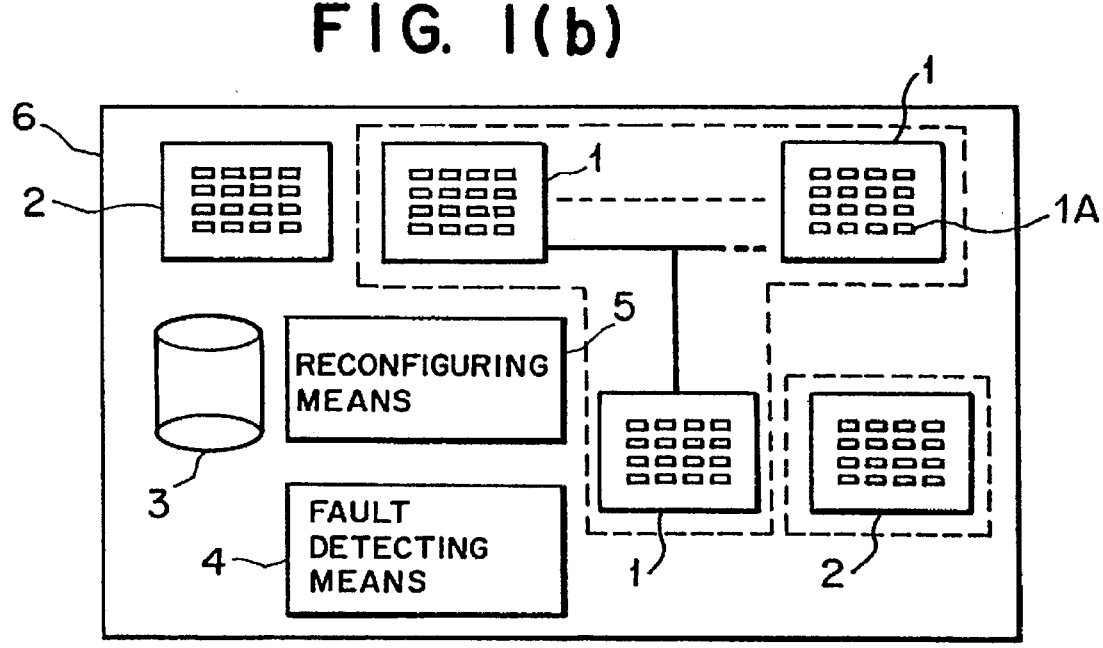
FIG. 1(b) is a block diagram showing a first aspect of the present invention.

FIG. 1(a) and FIG. 1(b) are respectively a block diagram showing an aspect of the present invention. FIG. 1(a) shows the state of an information processing apparatus 6 when a trouble, or fault, has happened. FIG. 1(b) shows the state of an information processing apparatus 6 when a trouble has been removed.

Referring to FIGS. 1(a) and 1(b), the information processing apparatus 6 includes a logic processing unit 1, a spare logic processing unit 2, data holding means 3, fault detecting means 4, and reconfiguring means 5.

Logic processing unit 1 can be reconfigured as logic circuits, each formed of plural logic forming elements 1A. A spare logic processing unit 2 can be reconfigured as a logic circuit formed of logic forming elements 1A, and reconfigures a predetermined function of each function of each logic processing unit 1. At least one of the spare logic processing units 2 are arranged in the system.

A data holding means 3 holds logic circuit configuration data for the logic processing unit 1. A fault detecting means 4 detects a fault occurring in the logic processing unit 1.

Numeral 5 represents a reconfiguring means. When the fault detecting means 4 detects a fault occurrence in the logic processing unit 1, the reconfiguring means 5 reads logic circuit configuration data for the faulty logic processing unit 1, out of the data holding means 3, and forms a spare logic processing unit 2 having the same logic circuit configuration as the faulty logic processing unit 1 by reconfiguring plural logic forming elements 1A, based on the logic circuit configuration data.

The information processing apparatus also includes logic forming element diagnosis means that diagnoses a faulty logic configuration element 1A in a disabled logic processing unit 1. The disabled logic processing unit which is formed of the remaining logic forming elements 1A, except the faulty logic forming element diagnosed by means of the logic forming element diagnosis means, can be regenerated as the spare logic processing unit 2.

Where there are plural logic processing units 1, a spare logic processing unit 2 can be previously configured in the same logic circuit configuration as that of a specific logic processing unit 1 among plural logic processing units 1.

Memory means that stores substitution information, using the spare logic processing unit 2, instead of the faulty logic processing unit 1, is prepared in the information processing apparatus. At a power-on or reset time after the substitution of the spare logic processing unit 2, the spare logic processing unit 2 can be used instead of the faulty logic processing unit 1, based on the substitution information of the memory means.

Power supply inhibiting means can be arranged to inhibit power supply to the unassigned spare logic processing unit 2 or the logic processing unit 1 after a fault occurrence.

Where plural logic processing units 1 are arranged, each logic processing unit 1 includes the fault detecting means 4 and the reconfiguring means 5. Both the data holding means 3 and the fault logic element diagnosis means are arranged in common to plural logic processing units 1.

The logic forming element 1A can be a logic cell being the minimum forming element of a logic circuit. In this case, the logic processing unit 1 and the spare logic processing unit 2 are either a logic module formed of plural logic cells or an integrated circuit formed of plural logic modules each formed of plural logic cells.

In this case, the logic processing unit 1 and the spare logic processing unit 2 can be a unit formed of plural integrated circuits each including plural logic modules each having plural logic cells. Moreover, the logic processing unit 1 and the spare logic processing unit 2 can be an information processor formed of units formed of plural integrated circuit each including plural logic modules each having plural logic cells.

In the information processing apparatus with self-repair function according to the first aspect of the invention, shown in FIGS. 1(a) and 1(b), the logic processing units 1 are formed as logic circuits from plural logic forming elements 1A to realize a predetermined function. The spare logic processing unit 2 has a reconstructible configuration acting as a logic circuit formed of plural logic forming elements 1A and can reproduce a predetermined function of each logic processing unit 1. The data holding means 3 holds logic circuit reconfiguration data for the logic processing unit 1.

When the fault detecting means 4 detects a fault occurrence in the logic processing unit 1 (refer to FIG. 1(a)), the reconfiguring means 5 reads logic circuit configuration data for the faulty logic processing unit 1, out of the data holding means 3 and reconfigures the spare logic processing unit 2 having the same function as the faulty logic processing unit 1 by using plural logic forming elements 1A, based on the logic circuit configuration data, thus restoring the pre-fault state (refer to FIG. 1(b)).

The logic forming element diagnosis means diagnoses the logic forming element 1A causing the fault occurrence in the faulty logic processing unit 1. The faulty processing unit formed of the logic forming elements 1A, except the logic forming element 1A diagnosed as a fault cause, can be used as the spare logic processing unit 2. Hence, the resultant reconfiguring means can be used for the reconfiguring process at the next possible fault occurrence.

Moreover, the spare logic processing unit 2 can be previously formed as a logic circuit having the same configuration as that of a specific logic processing unit 1 among plural logic processing units 1. Hence, the repair process can be done merely by switching a specific processing unit 1 to the spare logic processing unit 2, without performing a readout of logic circuit configuration data from the data holding means 3 and reconfiguration by the reconfiguring means 5.

At a power-on or reset time after the substitution of the spare logic processing unit 2, the spare logic processing unit 2 is used instead of the fault logic processing unit 1, based on the substitution information from the memory means. Hence, the reconfiguring means 5 does not need to subject the logic circuit to the reconfiguring process.

The power supply inhibiting means inhibits power supply to the spare logic processing unit 2 unassigned or the logic processing unit 1 after a fault has occurred, thus suppressing power consumption.

With plural logic processing units 1 prepared, both the fault detecting means 4 and the reconfiguring means 5 are prepared in each logic processing unit 1, while both the data holding unit 3 and the fault logic forming diagnosis means are prepared in common to the plural logic processing units 1. Thus the system configuration can be simplified.

The logic forming element 1A can be a logic cell having the minimum forming elements of a logic circuit. In this case, the logic processing unit 1 may be a logic module formed of plural logic cells, or an integrated circuit formed of plural logic modules each including plural logic cells. The spare logic processing unit 2 may be a logic module formed of plural logic cells, or an integrated circuit formed of a plural logic modules each including plural logic cells.

In this case, in order to remove faults, the logic processing unit 1 and the spare logic processing unit 2 may be a unit formed of plural integrated circuits, each formed of plural logic modules, each formed of plural logic cells. Moreover in order to remove faults, the logic processing unit 1 and the spare logic processing unit 2 may be an information processor including plural units each plural integrated circuits, each formed of plural logic modules each formed of plural logic cells.

Therefore, since the information processing apparatus 6 includes the logic processing units 1, the spare logic processing units 2, the data holding means 3, the fault detecting means 4, and the reconfiguring means 5, the normal function of an original forming element can be automatically reproduced and reconfigured against various faults in various forming elements included in the information processing apparatus 6. Hence there is an advantage in that the present embodiment can realize small, low priced, information processing apparatuses that can deal with multiple troubles.

The information processing apparatus includes the logic forming element diagnosis means and can use a fault logic processing unit, as the spare logic processing unit, formed of the remaining logic forming elements except the fault logic forming element diagnosed as a fault causing element. Hence the information processing apparatus according to the present embodiment can remove faults, with high reliability, without being influenced by multiple faults.

The spare logic processing unit 2 may be previously formed so as to have the same logic circuit configuration as a specific logic module among plural logic processing units 1. Thus, if a fault occurs in the logic processing unit 1 having the same function as that previously built in the spare logic processing unit 2, the recovery time can be advantageously shortened, thus improving the system processing speed.

Furthermore, where memory means, as well as a spare logic processing unit 2, that stores substitution information are used instead of a fault logic processing unit 1, the information processing apparatus can perform the IPL (initial program loader) process without detecting troubles even at a power-on or reset time after the substitutive use. This feature can contribute to the high reliability of the apparatus.

The logic processing unit 1 that functions as a power supply inhibiting means can inhibit power supply to the spare logic processing unit 2 or the logic processing unit 1 after a fault occurrence, thus saving apparatus power consumption.

Moreover, the data holding means 3, the fault logic forming element diagnosis means, and the reconfiguration data computing means are formed in common to plural logic processing units 1, and result in less space occupied by the apparatus, whereby the apparatus is small in size and low in price. The apparatus that has remotely separable functions improves the freedom in system design.

Figure 2A:
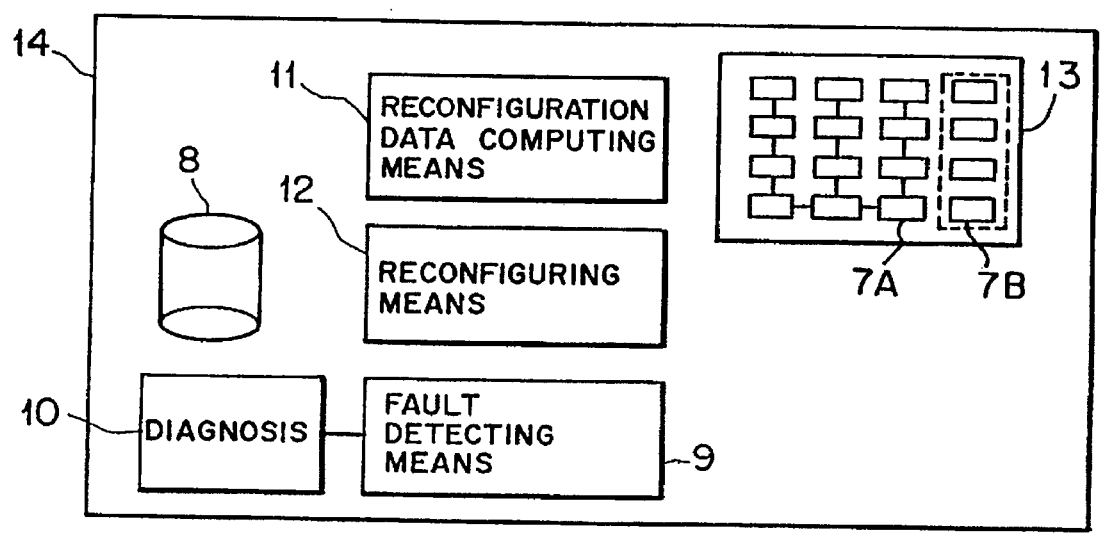
FIG. 2(a) is a block diagram showing a second aspect of the present invention.
Figure 2B:
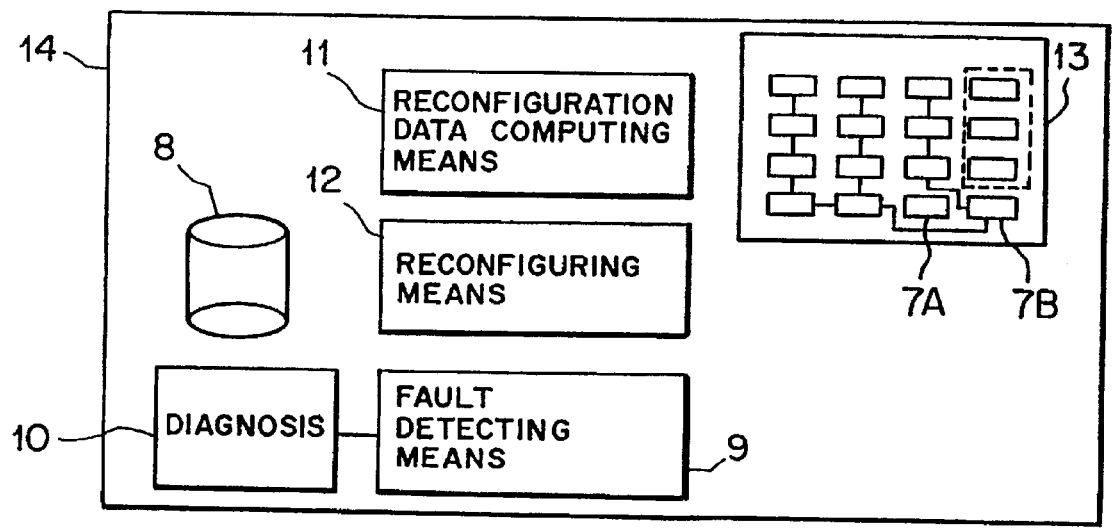
FIG. 2(b) is a block diagram showing a second aspect of the present invention.

FIGS. 2(a) and 2(b) are block diagrams each showing a second aspect of the present invention. FIG. 2(a) shows an information processing apparatus 14 at a fault occurrence time. FIG. 2(b) shows an information processing apparatus 14 at a fault recovery time (in FIG. 2(a)).

A logic processing unit 13 is formed as a logic circuit formed of plural logic forming elements 7A to realize a predetermined function. Numeral 7B represents spare logic forming elements. The spare logic forming elements 7B are not used in normal time. A data holding means 8 holds logic circuit configuration data for the logic processing unit 13. A fault detecting means 9 detects a fault occurring in the logic processing unit 13. A fault logic element diagnosis means 10 diagnoses the logic forming element 7A causing a fault in the fault logic processing unit 13.

When the fault detecting means 9 detects a fault occurrence in the logic processing unit 13, a reconfiguration data computing means 11 reads logic circuit configuration data regarding the faulty logic processing unit 13 out of the data holding means 8 and calculates reconfiguration data, based on the logic circuit configuration data, to calculate reconfiguration data to reconfigure the same function as that of the faulty logic processing unit 13, using the spare logic forming elements 7B and the remaining logic forming elements, except for the faulty logic forming element 7A A reconfiguring means 12 reconfigures the logic processing unit 13, based on the reconfiguration data calculated by the reconfiguration data computing means 11, to realize the same function of the faulty logic forming element 13, using the spare logic forming elements 7B and the remaining logic forming elements, except the faulty logic forming element 7A.

Memory means may be used that stores substitution information regarding the spare logic forming element 7B used instead of the faulty logic forming element 7A. At power-on or reset time after the substitution of the spare logic forming element 7B, the spare logic forming element 7B can be used instead of the faulty logic forming element 7A, based on the substitution information memory means.

A power supply inhibiting means may be arranged to inhibit power supply to spare unused logic forming element 7B or the faulty logic forming element 7A.

With the spare logic forming elements 7B used for reconfiguration at a fault recovery operation, the reporting means can be arranged to report that the number of the spare logic forming elements 7B in the logic processing unit 13 is less than a standard value.

Plural spare logic forming elements 7B can be previously arranged to establish the same function as that of a logic forming element 7A within the logic processing unit 13. Plural spare logic forming elements 7B may be added externally from outside the logic processing unit 13, according to the reconfiguration data calculated by the reconfiguration data computing means 11 at a fault occurrence time of the logic processing unit 13.

With plural logic processing units 13 prepared, the logic forming element 7A belonging to logic processing unit 13, other than the faulty logic processing unit 13, can be reassigned as the spare logic forming element 7B.

With plural logic forming elements 7A reconfigured as a logic circuit and at least one of spare logic processing units that can reproduce the predetermined function of each logic processing unit 13, the reconfiguration data computing means 11 may not need to calculate the reconfiguration data. In this case, the reconfiguring means 12 reads logic circuit configuration data regarding the logic processing unit 13, out of the data holding means 8. The spare logic processing unit may be reconfigured, based on the logic circuit reconfiguration data, to form a logic circuit having the same configuration as that of the logic processing unit 13 which cannot be rebuilt using plural logic forming units 7A. In this case, where plural logic units 13 are prepared, the spare logic processing unit can be previously formed so as to have the same configuration as a specific logic processing unit 13 among plural logic processing units 13.

Memory means can be arranged that stores substitution information regarding a spare logic processing unit used instead of the disabled processing unit 13. At a power-on or reset time after the substitution of the spare logic processing unit, the spare logic processing unit can be used instead of the disabled logic processing unit 13, based on the substitution information from the memory means.

A power supply inhibiting means can be arranged to stop power supply to the spare unused processing unit or the disabled logic processing unit 13.

With plural logic processing units 13 arranged, both the fault detecting means 9 and the reconfiguring means 12 are arranged to each logic processing unit 13. The data holding means 8, the fault logic forming element diagnosis means 10, and the reconfiguration data computing means 11 can be arranged in common to plural logic processing units 13. Furthermore, the logic forming element 7A can be a logic cell having the minimum logic forming element of a logic circuit and the spare logic forming element 7B can be a logic cell having the minimum logic forming element of a logic circuit. The logic processing unit 13 can be formed of a logic module formed of plural logic cells or an integrated circuit formed of plural logic modules each formed of plural logic cells.

The logic processing unit 13 can be a unit formed of plural integrated circuits, each formed of plural logic modules in turn formed of plural logic cells. The logic processing unit 13 can be an information processor including plural units formed of plural integrated circuits. The integrated circuits includes plural logic modules each formed of plural logic cells.

In the information processing unit with self-repair function shown in FIGS. 2(a) and 2(b), the logic processing unit 13 is formed as a logic circuit formed of plural logic forming elements 7A to realize a predetermined function.

Plural spare logic forming elements 7B are not used in normal time. The data holding means 8 holds logic circuit configuration data in the logic processing unit 13.

The fault detecting means 9 detects a fault occurrence in the logic processing unit 13. The fault logic element diagnosis means 10 diagnoses the logic forming element 7A being a fault causing source, in the fault logic processing unit 13.

Where the fault detecting means 9 detects a fault occurring in the logic processing unit 13 (refer to FIG. 2(a)), the reconfiguration data computing means 11 reads logic circuit configuration data regarding the fault logic processing unit 13, out of the data holding means 8. The reconfiguration data computing means 11 calculates reconfiguration data, based on the logic circuit configuration data, to reestablish the same function as that of the fault logic processing unit 13, using the spare logic forming element 7B and the remaining logic forming element, except the faulty logic forming element 7A.

The reconfiguring means 12 reconfigures the logic processing unit 13, based on the reconfiguration data calculated by the reconfiguration data calculating means 11, to realize the same function as the fault logic processing unit 13, using the spare logic forming element 7B and the remaining logic forming elements, except the faulty logic forming element 7A. Thus a fault can be removed (refer to FIG. 2(b)).

At a power-on or reset time after the substitution of the spare logic forming element 7B, the reconfiguring means 12 does not need to perform a reconfiguration process, based on the substitution information of the memory means, when using the spare logic forming element 7B instead of the faulty logic forming element 7A.

A power supply inhibiting means inhibits power supply to the spare logic forming element 7B not used or the faulty logic forming element 7A, thus suppressing electric power consumption.

The reporting means can report when using spare logic forming elements 7B for reconfiguration results in the number of the spare logic forming elements 7B in the logic processing unit 13 are less than a fixed value.

As shown in FIGS. 2(a) and 2(b), the logic processing unit 13 includes plural spare logic forming elements 7B. The spare logic forming elements 7B can be externally added from outside the logic processing unit 13, according to the reconfiguration data calculated by means of the reconfiguration data computing means 11 when a fault occurs in the logic processing unit 13, thus simplifying the configuration of the logic processing unit 13.

Where the information processing apparatus 14 includes plural logic processing units 13, the spare logic forming element 7B can be reconfigured using the logic forming elements 7A in the logic processing units 13, other than the faulty logic processing unit 13.

With plural logic forming elements 7A reconstructible as a logic circuit, at least one of spare logic processing units that can reproduce the predetermined function of each logic processing unit 13, the reconfiguration data computing means 11 does not need to calculate the reconfiguration data. In this case, the reconfiguring means 12 reads logic circuit configuration data regarding the disabled logic processing unit 13 out of the data holding means 8 and reconfigures the spare logic processing unit, based on the logic circuit configuration data, by using plural logic forming elements 7A to establish a logic circuit having the same configuration as the disabled logic processing unit 13.

Where plural logic processing units 13 are arranged, a spare logic processing unit may be previously formed so as to have a logic circuit having the same configuration as a specific logic processing unit 13 among plural logic processing units 13. Thus, where the specific logic processing unit 13 cannot be reconfigured, a repair operation can be done merely by switching the specific logic processing unit 13 to the spare logic processing unit, without reading data out of the data holding means 8 or performing the reconfiguration operation by the reconfiguring means 12.

At a power-on or reset time after the substitutive use of the spare logic processing unit, the reconfiguring means 12 is not needed to perform a reconfiguration process of a logic circuit.

The power supply inhibiting means stops power supply to the spare logic processing unit 13 not used or the disabled logic processing unit 13, thus suppressing power consumption.

Where plural logic processing units 13 are arranged, the system configuration can be simplified by arranging the fault detecting means 9 and the reconfiguring means 12 to each logic processing unit 13, and arranging the data holding unit 8, the fault logic forming element diagnosis means 10, and the reconfiguration data computing means 11 in common to plural logic processing units 13.

Furthermore, the logic forming element 7A can be a logic cell having the minimum component of a logic circuit. The logic forming element 7B can be a logic cell having the minimum component of a logic circuit. In this case, the logic processing unit 13 can be formed of a logic module formed of plural logic cells or of an integrated circuit including plural logic module formed of plural logic cells.

The logic processing unit 13 can be a unit formed of plural integrated circuits each formed of plural modules each formed of plural integrated circuits. The logic processing unit 13 can be an information processor formed of plural units each formed of plural integrated circuits in turn formed of plural modules formed of plural logic cells.

As described above, the information processing apparatus includes the logic processing units 13, the spare logic forming elements 7B, the data holding means 8, the fault detecting means 9, the fault logic element diagnosis means, the reconfiguration data computing means, and the reconfiguring means 12. Hence reconfiguration can be automatically performed to restore the normal function of components in the information processing apparatus 14 against various faults in the components. This feature can deal with multiple faults and lead to the system in small size and at low price.

Moreover, arranging the memory means facilitates an IPL process even at a power-on or reset time, without having to detect the system trouble, thus contributing to a high reliability of the system.

Having a power supply inhibiting means can stop power supply to the logic forming element causing a fault so that the power consumption of the system can be saved.

The number of the spare logic forming elements 7B can be managed by the reporting means, whereby the reliability of the system can be improved.

Since plural spare logic forming elements 7B are previously arranged within the logic processing unit 1, a circuit can be reconstructed using the fault logic processing unit 13. Hence the saved system installation space enables small-sized, low priced information processing apparatuses.

The spare logic forming element 7B externally added can restore the logic processing unit 13 subjected to faults several times, with high reliability, whereby the self-repair capability can be remarkably improved.

With plural logic processing units 1 arranged, the logic forming element 7A in the logic processing unit 1 other than the fault logic processing unit 13 can be used as the spare logic forming element 7B. Thus flexible self-repair function can be realized, based on the operational priority of the function of each logic processing unit 13.

(b) Explanation of First Embodiment

Figure 3:
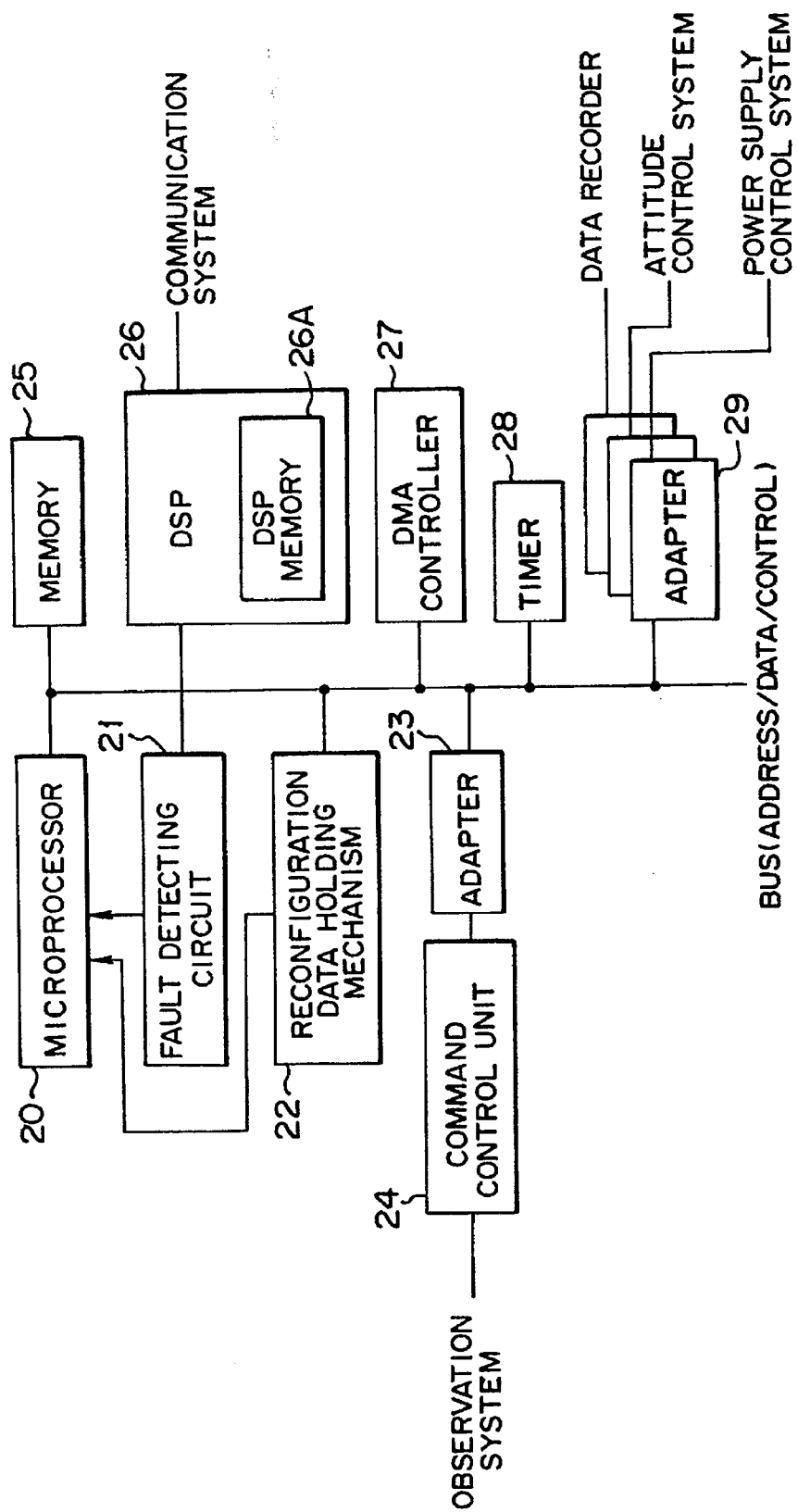
FIG. 3 is a schematic block diagram showing an information processing apparatus with self-repair function, for example, mounted on a scientific observation satellite, according to the first embodiment of the present invention.

FIG. 3 is a schematic block diagram showing the information processing apparatus with a self-repair function according to the first embodiment of the present invention.

The information processing apparatus (information processing system) shown in FIG. 3 is mounted, for example, on artificial scientific observation satellites.

The information processing unit, as shown in FIG. 3, includes a microprocessor unit (MPU) 20, a fault detecting circuit 21, a reconfiguration data holding mechanism 22, an adapter 23, a command management unit 24, a memory 25, a DSP (digital signal processor) unit 26, a DMA (direct memory access) controller 27, a timer 28, and an adapter group 29. The DSP unit 26 includes a DSP memory 26A.

The MPU 20 processes and controls the entire processing system. The MPU 20 is connected to the communication systems via the adapter 23 and the command management unit 24 and to the observation systems via the DSP (digital signal processor) unit 26. The MPU 20 also is connected to the data recorder, the attitude control system, and the power supply system respectively via the adapter group 29.

The communication system, the observation system, the data recorder, the attitude control system, and the power supply system are not shown in FIG. 3.

Each of the adapter 23, the memory 25, the DSP unit 26, the DMA controller 27, the timer 28, and the adapter group 29 include plural reprogrammable logic circuits, for example, FPGAs (field programmable gate arrays).

The FPGA is an ASIC (application specific integrated circuit) with sufficient integration density that can define the function by a user alone. An FPGA formed of plural logic cells can realize various functions by combining the logic cells by means of programming by a user.

Recently, the research and development on an increased integration of electronic circuits has technologically improved the characteristic of many electronic systems. An FPGA can be developed by a user alone as a result of a drastic progress in the logic architecture.

The FPGA provides the large integration o custom VLSIs and the short turnaround time of standard ICs. Since the user can flexibly program the FPGA, the risk due to a change in design or a variation in yield can be largely reduced.

According to the present embodiment, each FPGA is programmed to establish previously various predetermined functions before a satellite is launched. The FPGA can be reconfigured the internal logic configuration under commands from the MPU 20 even after the satellite has been launched in orbit. Logic cells not used inside each FPGA are used as spare logic circuits.

Figure 4:
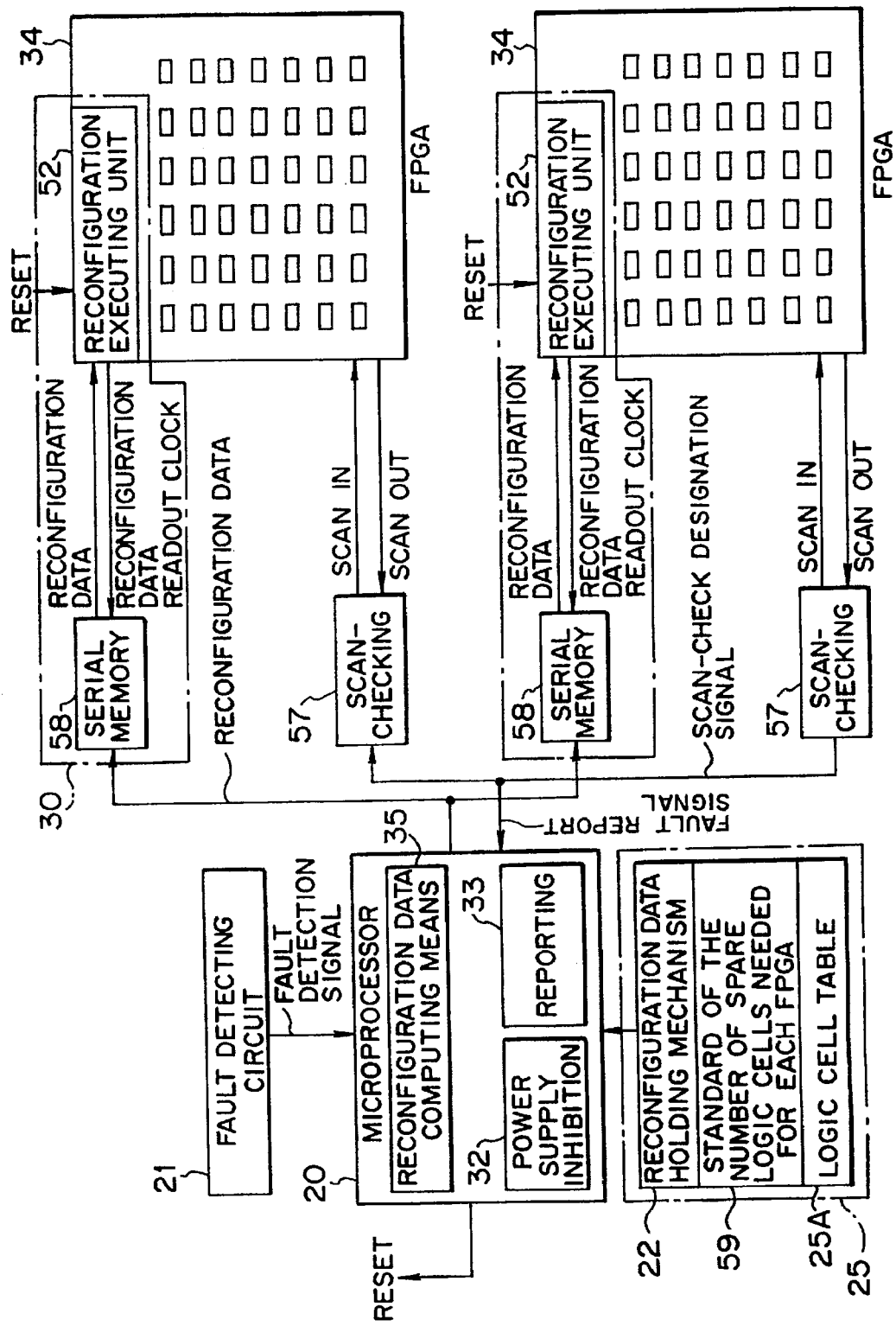
FIG. 4 is a detailed block diagram showing an information processing apparatus with self-repair function according to the first embodiment of the present invention.

FIG. 4 is a block diagram showing the main portion of the information processing apparatus with a self-repair function according to the first embodiment of the present invention. The information processing apparatus shown in FIG. 4 is formed, for example, of an integrated circuit formed of plural logic modules.

Numeral 34 represents a FPGA (field programmable gate array, logic processing unit). The FPGA 34 is a logic module that can reconfigure a logic circuit to realize a predetermined function, by using plural logic cells (logic forming elements) and plural spare logic cells (spare logic forming elements). The FPGA 34, for example, can realize the function of the DSP unit 26, the DMA controller 27 or the timer 28, shown in FIG, 3.

The logic cell is the minimum component of a logic circuit. The integrated circuit is the minimum component of programmable hardware including plural logic modules. The logic module has a specific function formed by plural logic cells.

The fault detecting circuit (fault detecting means) 21 corresponds to the fault detecting circuit shown in FIG. 3. If a fault occurs in the FPGA 34, a fault detecting signal is produced, whereby the fault occurrence is reported to the MPU 20.

The memory 25 corresponds to the memory 25 shown in FIG. 3. The memory 25 has the reconfiguration data holding mechanism (data holding means) 22 that holds logic circuit configuration data in the FPGA 34 as well as the region 59 that stores the number as a standard value of spare logic cells needed in the FPGA 34.

The memory 25 includes the logic cell table (memory means) 25A registering the presence or absence of a logic cell in each FPGA 34, for example, as shown in FIG. 7. The logic cell table 25A records substitution information representing that a spare logic cell is being used instead of faulty logic cell. At a power-on reset time after substitutionally using a spare logic cell, the FPGA 34 having a predetermined function can be formed by using a spare logic cell instead of a faulty logic cell, based on substitution information from memory means.

Figure 5:
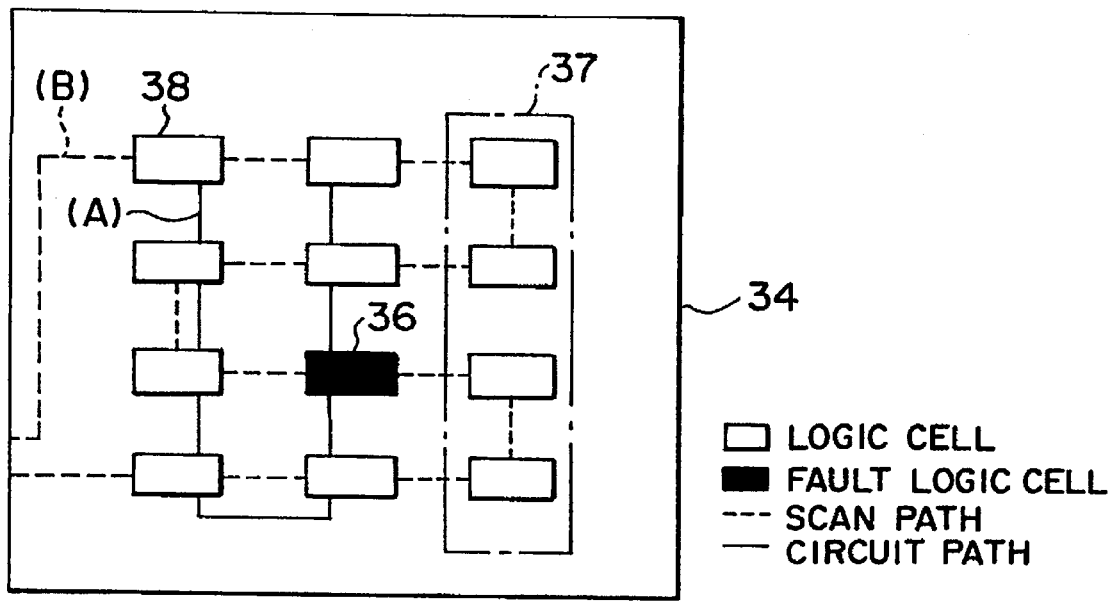
FIG. 5(a) is a block diagram used for explaining the operation of the first embodiment according to the present invention.
FIG. 5(b) is a block diagram used for explaining the operation of the first embodiment according to the present invention.
Figure 5:
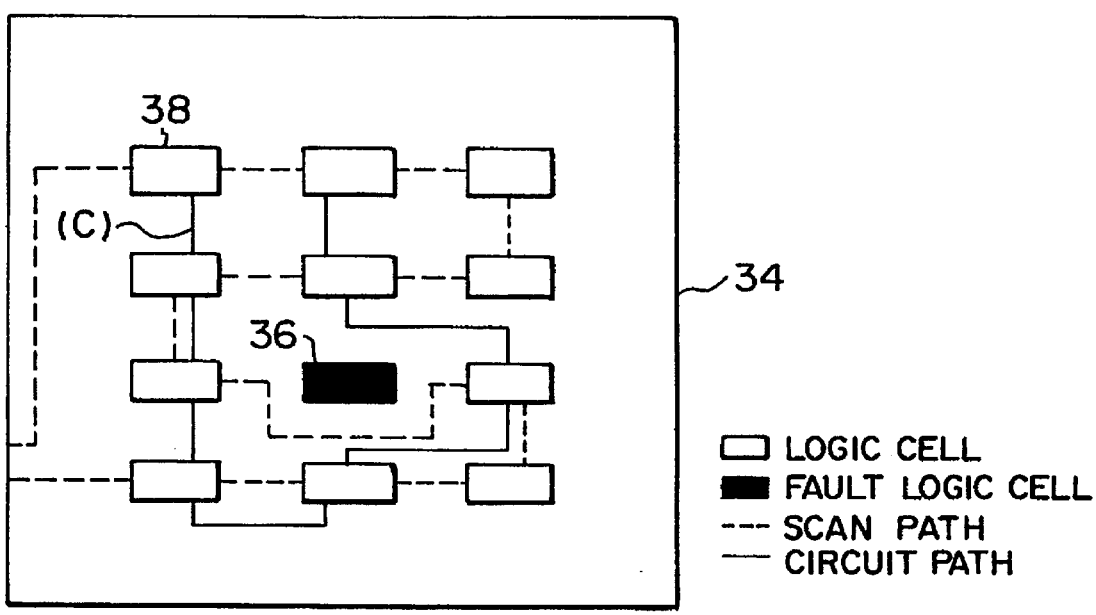

Numeral 57 represents a scan-checking circuit (fault logic element diagnosis means). The scan-checking circuit 57 scan-checks the FPGA 34 under a command (a scan-check designating signal) from the MPU 20 that receives a fault detecting signal from the fault detecting circuit 21. Thus a fault causing logic cell in a faulty FPGA 34 is diagnosed and specified. The MPU 20 receives as a fault report signal the diagnosis result (for example, that the logic cell 36 shown in FIGS. 5(a) and 5(b) is a fault causing logic cell).

The MPU 20 controls the process over the entire processing apparatus. Where the fault detecting circuit 21 detects a fault occurring in the FPGA 34, the MPU 20 functions as reconfiguration data computing means 35 that reads the logic circuit configuration data regarding the faulty FPGA 34 out of the reconfiguration data holding mechanism 22 in the memory 25. Thereafter, the MPU 20 calculates reconfiguration data to reconfigure the same function as that of the faulty FPGA 34, based on the logic circuit configuration data, by using a spare logic cell and the remaining logic cells, except the logic cell diagnosed by the scan-checking circuit 57. The MPU 20 also produces a reset signal which resets the FPGA 34 to reconstruct it.

Figure 8:
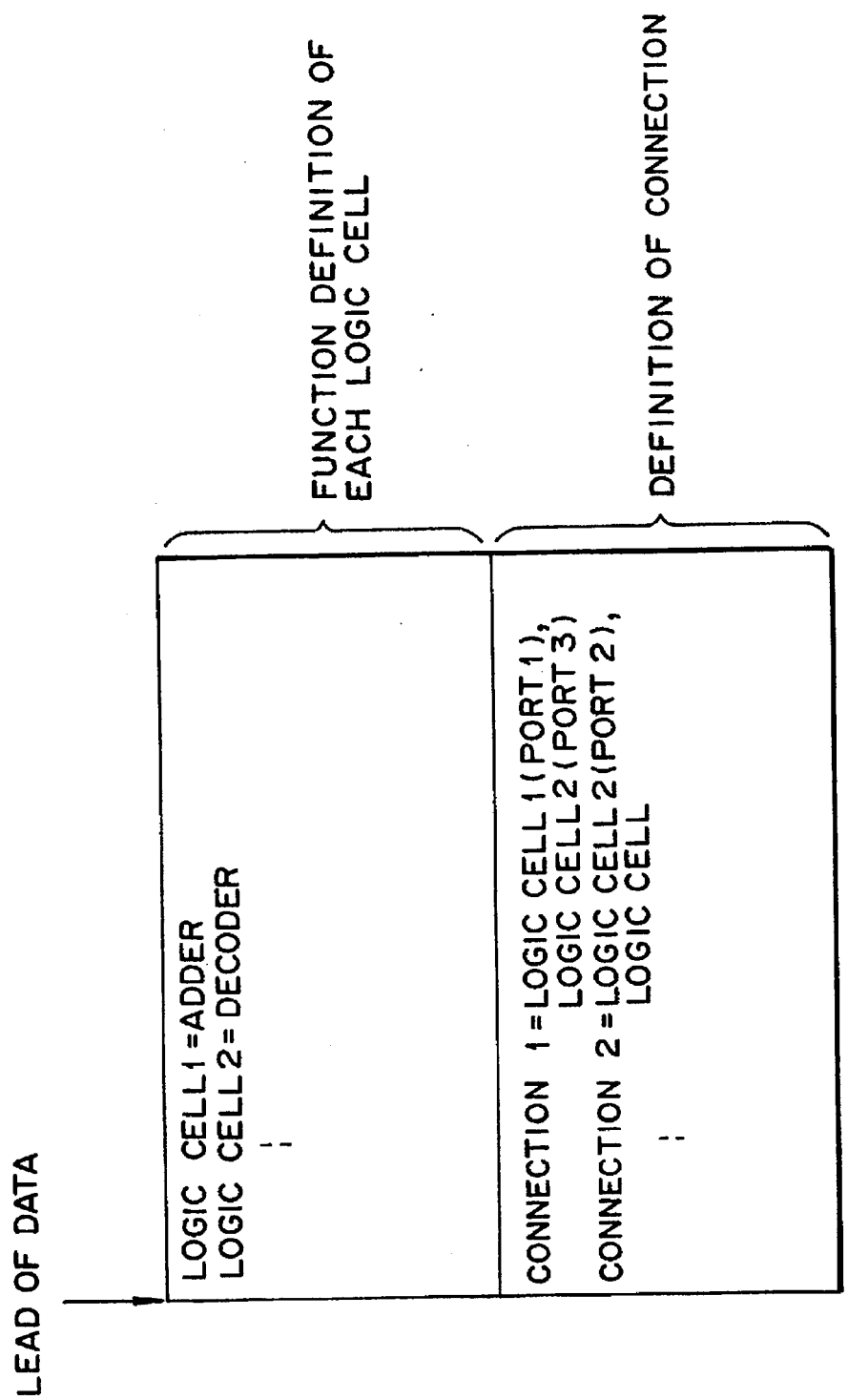
FIG. 8 is a diagram showing reconfiguration data calculated by means of the reconfiguration data computing means.

The reconfiguration data calculated by the reconfiguration data computing means 35 has the arrangement shown in FIG. 8.

The reconfiguration data calculation may fail when the number of the remaining spare logic cells is less that 5%. Hence, the number of the remaining spare logic cells, as a standard value, stored in the standard value store region 59 in the memory 25 is set, for example, to 10% of the number of all the logic cells. Hence, the MPU 20 maintains the number of the remaining spare logic cells to 5% or more. Hence the erroneous calculation of the reconfiguration data can be prevented.

The reconfiguration (reconfiguring means) 30 reconfigures the FPGA 34, based on the reconfiguration data calculated by the MPU 20, by using a spare logic cell and the remaining logic cells except a faulty logic cell diagnosed by the scan-checking circuit 57, to restore the same function as that of the faulty FPGA 34. The reconfiguration mechanism 30 includes a reconfiguration execution unit 52 and a serial memory 58.

The serial memory 58 receives the reconfiguration data calculated by the MPU 20, in parallel data form, and converts it into serial data (bit stream data), according to the clocks read out of the FPGA 34, thus sending the result to the FPGA 34.

The reconfiguration execution unit 52 is arranged on the FPGA 34 and reconstructs a logic circuit by using a spare logic cell and the remaining logic cells except the defect logic cell, based on the reconfiguration data from the serial memory 58.

When a fault is detected, for example, in the FPGA 34, shown in FIG. 5(a), the MPU 20 acts as a logic circuit, formed of the logic cells 38 connected together with solid lines (A), and instructs the scan checking circuit 57 to pass the scanning operation, as shown with dotted lines (B). The faulty logic cell 36 is specified among the logic cells 38 by means of the scan-check result of the scan-checking circuit 57.

In the reconfiguration mechanism 30, the FPGA 34 is reconstructed as shown with solid lines (C) in FIG. 5(b) by rewiring a faulty logic cell 36 and the remaining logic cells, except a faulty logic cell 36 and a spare logic cell 37. As a result, the logic circuit can be rebuilt to have the same function as the logic circuit shown in FIG. 5(a).

The MPU 20 functions as a power supply inhibiting means 32 that diverts power supply from unused spare logic cells or defective logic cells in the FPGA 34. The MPU 20 also functions as reporting means that alerts the communications systems 33 to the fact that the number of spare logic cells in the FPGA 34 has become less than the standard value stored in the memory 25.

Figure 6:
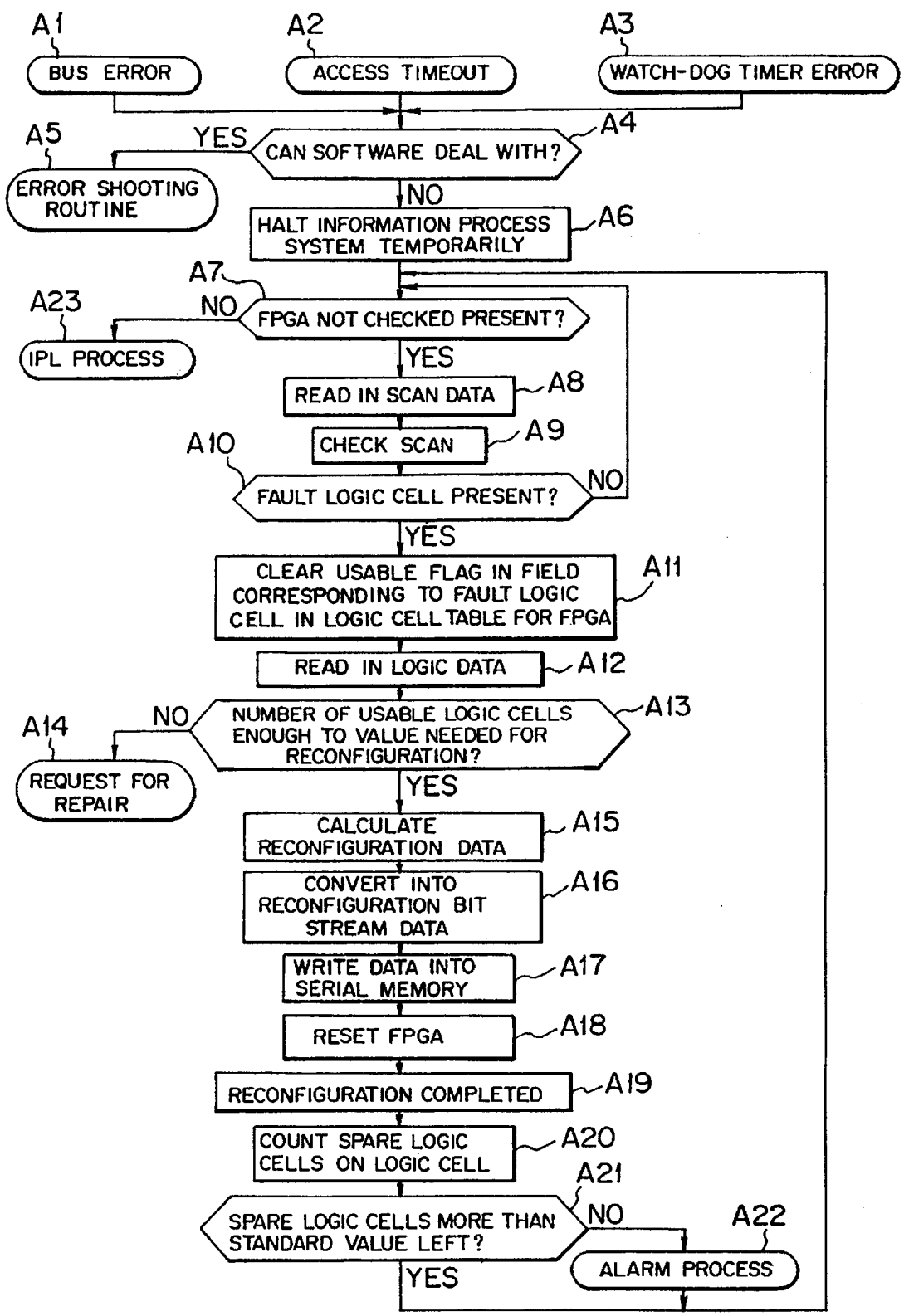
FIG. 6 is a flowchart used for explaining the operation of the first embodiment of the present invention.

The operation of the information processing apparatus with a self-repair function, according to the first embodiment of the present invention will be described below with reference to the flow chart shown in FIG. 6.

When the fault detecting circuit 21 detects faults due to bus error (step A1), access timeout (step A2), or watchdog timer (step A3), it produces a fault detection signal to the MPU 20. The MPU 20 receives the fault detection signal from the fault detecting circuit 21 and decides whether software can deal with the detected fault (step A4). If it is decided that software can deal with the fault, the fault error processing routine is executed (from the step A4 to step A5 via YES route). If it is decided that software cannot deal with the fault, the information processing apparatus is halted temporarily (step A6).

Next, the MPU 20 produces a scan-check designation signal to the scan checking circuit 57 to subject all the FPGAs 34 to a scan-checking operation (steps A7 to A10). The FPGA 34 receives a signal (scan-in) from the scan checking circuit 57 (step A8) and sends back a signal (scan-out) to the scan checking circuit 57, via the scan path, for example, shown with dotted lines (B) in FIG. 5(a). The scan checking circuit 57 scan-checks the signal (scan-out) (step A9) and diagnoses and specifies a fault logic cell in a fault FPGA 34 (e.g. the logic cell 36 in FIGS. 5(a) and 5(b).

The diagnosis conclusion of the logic cell from the scan-checking circuit 57 is output as a fault report signal to the MPU 20. When it is decided that a defect logic cell does not exist in the FPGA 34, subjected to a scan checking according to the fault report signal, the MPU 20 repeats the scan checking to another FPGA 34 (NO route in step A10). When it is decided that a defect logic cell exists in the FPGA 34, the usable flag of a field corresponding to the fault logic cell in the logic cell table 25A stored in the memory 25 (e.g. shown in FIG. 7) is cleared (step A11). Thus the MPU 20 excludes the defect logic cell in the FPGA 34 from use.

If a faulty logical cell exists, the MPU 20 controls in such a manner that the logical cell is not used in the FPGA 34. In order to judge whether the needed number of usable logic cells are available to reconstruct a circuit or not, the MPU 20 also reads logic circuit configuration data in the FPGA 34, out of the memory 25, (step A12) and reads the number of spare logic cells needed for the FPGA 34, as a standard value (step A13).

If usable logic cells are less than the needed number, the circuit cannot be reconstructed, so that the user must be notified of the required repair (step A14). If there are enough usable logic cells reconstruct a circuit, the reconfiguration data computing means 35 within the MPU 20 calculates the reconfiguration data, shown in FIG. 8, by using the logic circuit configuration data in FPGA 34 (step A15).

The reconfiguration data calculated in the MPU 20 is converted into bit-stream data as a format readable by the FPGA 34 (step A16) written into the serial memory 58 in the reconfiguration mechanism 30 (step A17).

Then the MPU 20 sends a reset signal to the FPGA 34 (step A18) to reset the logic circuit configured in the FPGA 34. The reconfiguration execution unit 52 outputs reconfiguration data readout clocks to the serial memory 58 to read out the reconfiguration data, thus reconfiguring the FPGA 34 according to the reconfiguration data (step A19).

Thereafter, the MPU 20 refers to the logic cell table 25A stored in the memory 25 and counts the number of spare logic cells in the reconfigured FPGA 34 (step A20).

Here, the number of the spare logic cells in the reconfigured FPGA 34 is compared with the number (as the standard value 59) of spare logic cells needed for each FPGA 34 (step A21).

If the number of remaining spare logic cells are more than the standard value, the flow goes back to the step A7. Then if any FPGAs 34, which have not been scan-checked by means of the scan checking circuit 57, are found, the flow goes to the steps A8 to A22.

If the number of remaining spare logic cells are not more than the standard value, the reporting means 33 alerts the communications systems (step A22). The flow goes back to the step A7.

Where it is decided that a fault logic cell does not exist in any of the FPGAs 34 in the step A7, an initial program reading process (IPL process) is performed (from step A7 to step A23 via NO route) to remove the fault.

As described above, according to the first embodiment of the present invention, the information processing apparatus with self-repair function includes the FPGAs 34, the spare logic cells 37, the reconfiguration data holding mechanism 22, the fault detecting circuit 21, the scan checking circuit 57, the microprocessor 20, and the reconfiguring means 30. Thus, in order to cope with various faults in components in the information processing apparatus, components can be automatically reconfigured to reproduce the original normal function of a fault component. The information processing apparatus can deal with multiple faults and is small in size and low in price.

With the logic cell table 25A arranged, the information processing apparatus can perform an IPL process even at a power-on or reset time, without detecting a system failure. This feature contributes advantageously to the high reliability of the apparatus. Furthermore, the MPU 20 which functions as the power supply inhibiting means 32 can divert the power supply from a fault logic cell, thus saving the system power consumption. The MPU 20 which functions as the reporting means 33 can manage the number of spare logic cells, thus improving the system reliability. Plural spare logic cells previously arranged within the FPGA 34 can reconfigure a circuit using a fault FPGA. Thus the saved system installation space can realize the information processing apparatus in a small size and at low price.

According to the present embodiment, as shown in FIG. 4, two FPGAs 34, each acting as a logic processing unit, have been described above. The present invention should not be limited to the above embodiment. Any number of FPGAs 34 may be arranged.

(c) Explanation of Second Embodiment

Figure 9:
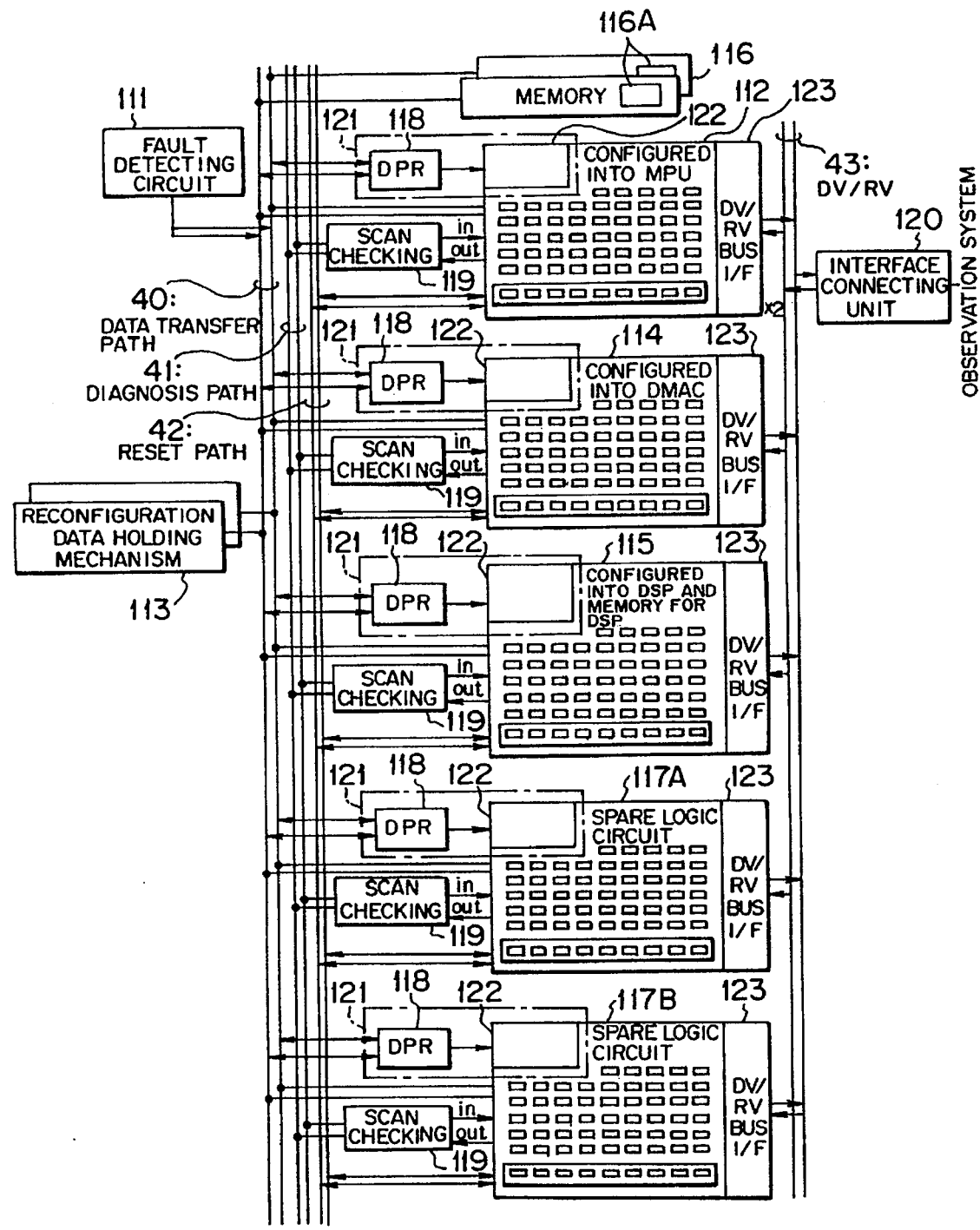
FIG. 9 is a block diagram showing an information processing apparatus with self-repair function according to the second embodiment of the present invention.

FIG. 9 is a detailed block diagram showing the main portion of the information processing apparatus with self-repair function according to the second embodiment of the present invention. Like the apparatus according to the first embodiment shown in FIG. 3, the information processing apparatus shown in FIG. 9 is mounted, for example, on a scientific observation artificial satellite. For example, the information processing apparatus is constructed a printed board unit formed of plural circuits.

The information processing apparatus, shown in FIG. 9, includes a fault detecting circuit 111 having substantially the same function as that shown in FIG. 3, a MPU 112, a reconfiguration data holding mechanism 113, a DMA (direct memory access) controller 114, a DSP (digital signal processor), a DSP unit 115 including a DSP memory, and a memory 116.

A DPR (dual port RAM) 118 functions substantially as same as the serial memory 58 shown in FIG. 4. A scan-checking circuit 119 functions substantially as the scan checking circuit 57 shown in FIG. 4. An interface connection unit 120 is also provided.

Unlike the first embodiment, the MPU 112, the DMA controller 114, the DSP unit 115 and two spare logic circuits 117A and 117B are formed of FPGA (logic processing unit) respectively (hereinafter each element is referred to as FPGA).

The FPGAs 112, 114, and 115 are respectively a logic module acting as a logic circuit formed of plural logic cells. The FPGA 112 acts as a MPU. The FPGA 114 acts as a DMA controller. The FPGA 115 acts as a DSP unit. The FPGAs 117A and 117B can be reconfigured as a logic circuit formed of plural logic forming elements. The predetermined function of each of the FPGAs 112, 114, and 115 can be reproduced.

The FPGAs 112, 114, 115, 117A and 117B are connected to the reconfiguration data holding mechanism 113 and the memory 116 via the data transfer bus 40, the diagnosis bus 41, and the reset bus 42.

That is, the data transfer bus 40 interconnects the fault detecting circuit 111, the reconfiguration data holding mechanism 113, the memory 116, and the DPR 118 for each FPGA. The diagnosis bus 41 interconnects the scan checking circuits 119 of the FPGAS. The reset bus 42 connects mutually the FPGAs 112, 114, 115, 117A, and 117B. The FPGAs 112, 114, 115, 117A, and 117B are connected to the interface connection unit 120 via the DV/RV bus interface 123 and the DV/RV bus 43.

The data transfer bus 40, the diagnosis bus 41, the reset bus 42, and the DV/RV bus 43 are duplexed to switch the system mode at a fault occurrence time. The FPGA 112, the reconfiguration data holding mechanism 113, and the memory 116 are duplexed to switch the system mode at a fault occurrence time.

The fault detecting circuit (fault detecting means) 111 detects a fault of the FPGA formed as a logic circuit functioning as a MPU, DMA controller, or the DSP unit. A fault occurrence is output as a fault detecting signal to the MPU 112 via the data transfer bus 40.

The FPGA 112 acting as a MPU controls the entire information processing apparatus. The FPGA 112 is connected to communications systems (not shown) via the FPGA 115 acting as a DSP unit and the interface connection unit 120.

According to the present embodiment, the FPGA 112 functions as reconfiguration data computing means that calculates reconfiguration data. When the fault detecting circuit 111 detects a fault occurring in the FPGA 112 acting as a MPU, the FPGA 114 acting as a DMA controller, or the FPGA 115 acting as a DSP unit, the FPGA 112 reads logic circuit reconfiguration data out of the reconfiguration data holding mechanism 113, according to the state of the fault FPGA and the states of other FPGAS. The FPGA 112 then reconfigures a logic processing unit having the same function as the faulty logic processing unit, according to the resultant logic circuit configuration data, using a spare logic cell and logic cells other than the faulty logic cell diagnosed as a faulty element by the scan-checking circuit 119.

The FPGA 112 functions as a power supply inhibiting means that inhibits power supply to the unused spare logic circuits 117A and 117B and a faulty FPGA.

The reconfiguration data holding mechanism (data holding means) 113 holds the logic circuit configuration data in the FPGAs 112, 114, and 115.

The scan-checking circuit (logic forming element diagnosis means) 119 is communicates with each FPGA so as to diagnose a fault logic forming element included in a faulty logic processing unit. The diagnosis conclusion is output to the FPGA 112 acting as a MPU.

The memory 116 functions as memory means that stores substitution information representing that the FPGAs 117A and 117B are used as a spare logic circuit instead of the faulty FPGA. At a power on or reset the spare logic circuits 117A and 117B are used instead of the faulty FPGA, based on the substitution information stored in the memory 116. The memory 116 stores the number as a standard value of spare logic cells needed to each FPGA and includes a logic cell table 116A that registers the usable or unusable state of logic cells in each FPGA.

For example, the logic cell table 116A in each of the FPGAs 112, 114, 117A, and 117B registers the number of usable logic cells and the number of disabled logic cells in a ratio, as shown in FIGS. 10(a) and 10(b). The number of unusable logic cells in each FPGA has the ratio (D) and the number of spare logic cells has the ratio (E). The number of logic cells needed for a logic circuit to form each FPGA has the ratio (F).

FIG. 10(a) shows a fault occurrence in the FPGA 115 acting as a DSP unit. The region (G) represents that the number of logic cells are short, even if spare logic cells are used.

Numeral 121 represents reconfiguration mechanism (reconfiguring means). Where the fault detecting circuit 111 detects a fault occurring in the FPGA 112, 114, or 115, the reconfiguring mechanism 121 reads logic circuit configuration data regarding the faulty FPGA out of the reconfiguration data holding mechanism 113, and then performs a logic circuit reconfiguring process according to the logic circuit configuration data, as well as the usable or unusable state of a logic cell in each FPGA stored in the logic cell table 116A in the memory 116. Each FPGA includes the DPR 118 and the reconfiguration execution unit 122. The reconsideration process has three aspects as follows: According to the first aspect, a FPGA is reconfigured using spare logic cells in a faulty FPGA, like the first embodiment.

Where reconfiguration cannot be performed according to the first aspect, it is controlled so as to configure by interchanging the FPGAs 112, 114, and 115, according to the second aspect.

As shown in FIG. 10(a), with a fault occurring in the FPGA 115 acting as a DSP unit among three FPGAs 112, 114, and 115, except the spare logic circuits 117A and 117B, if the logic cells in the region (G) is still short in number even after the use of spare logic cells, the usable logic cells in other FPGA 112 or 114 are referred to in number. If the function of the FPGA 115 is interchanged with other FPGA to reconfigure a logic circuit, the FPGA 115 and the FPGA to be interchanged are reset, whereby the reconfiguration can be performed in the same manner as the first embodiment.

In this case, the faulty FPGA 115 is functionally interchanged with the FPGA 114 acting as the DMA controller. In other words, as shown in FIG. 10(b), a shortage of logic cells can be solved by reconfiguring the FPGA 114 as a DSP unit and the FPGA 115 as a DMA controller. Thus the DMA controller and the DSP unit can be normally operated.

As to the third aspect, where reconfiguration cannot be established according to the above methods, the MPU 112 reconfigures a logic circuit having the same configuration as the faulty FPGA using the FPGAs 117A and 117B as spare logic circuits.

Figure 11:
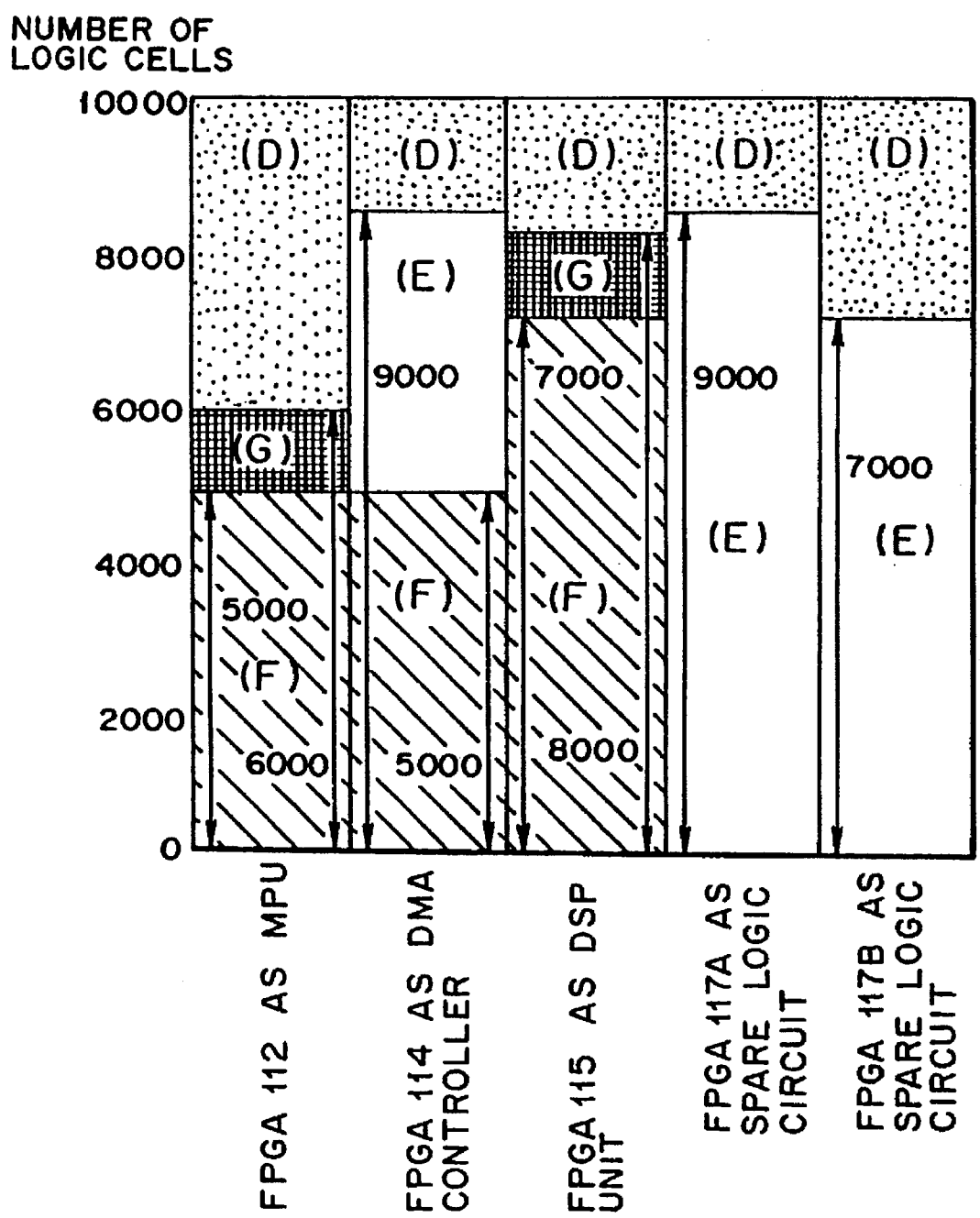
FIG. 11 is a diagram showing an example of the ratio of the number of usable logic cells to the number of disabled logic cells at a trouble occurrence time.

FIG. 11, for example, shows the case where a fault occurs in the FPGA 112 acting as a MPU and the FPGA 115 acting as a DSP unit, and where the logic cells in the region (G) are short in number even in the use of spare logic cells. The MPU 112, as shown in FIG. 12, prepares a first table sorted in an increasing order of the number of usable logic cells in each FPGA, prepares a second table sorted in an increasing order of the number of logic cells needed to form logic circuits with various functions, and compares the number of corresponding logic cells, and decides whether there is a combination where the number of usable logic cells in all the FPGAs>the number of logic cells needed to form logic cells with various functions.

In this case, the MPU 112 can desirably combine the number of usable logic cells in each of the FPGAs 114, 117A, 115, 117B, and 112 with the number of logic cells needed to form as a logic circuit each of the DSP unit, MPU, DMA controller, and two spare logic circuits, respectively.

Figure 13:
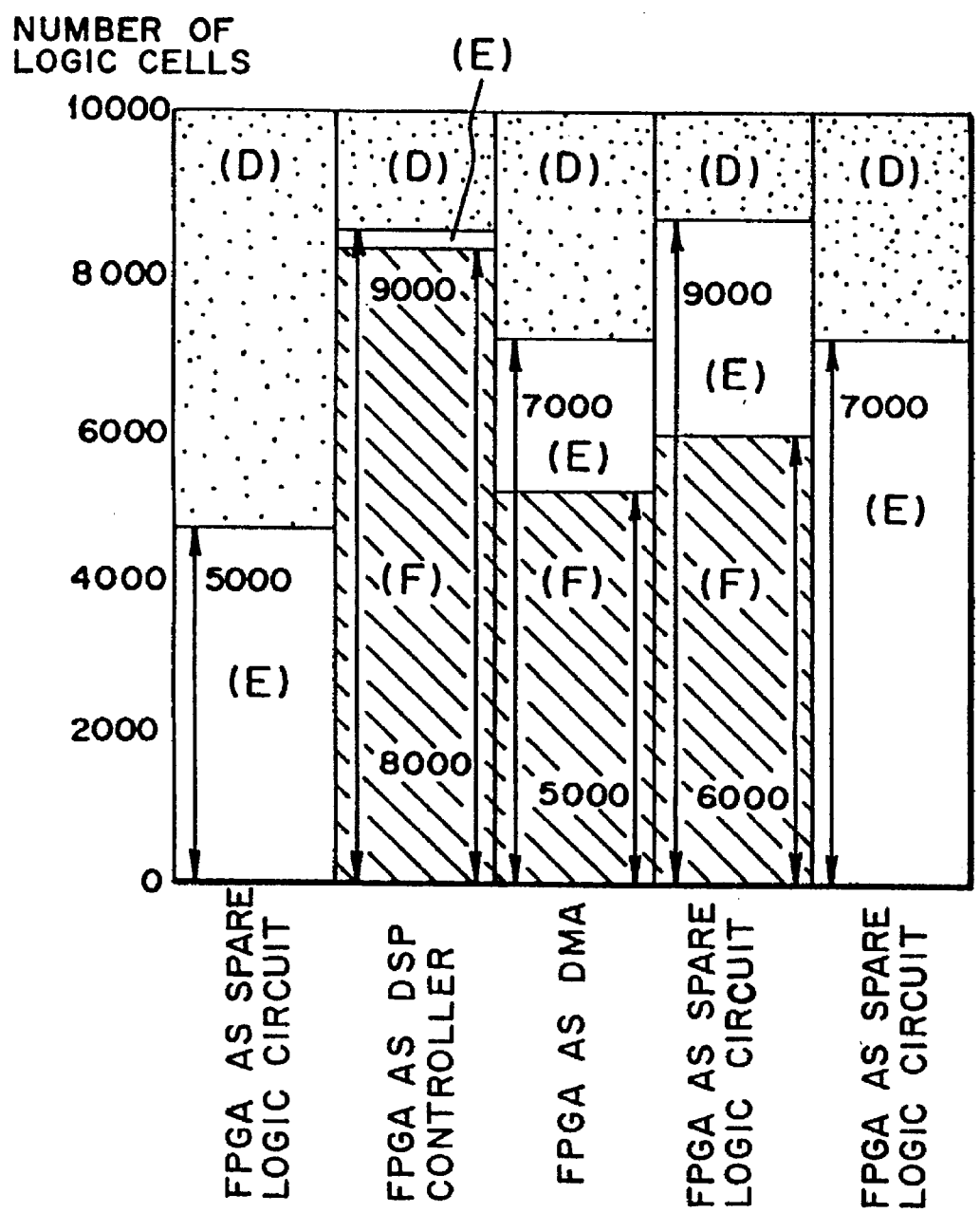
FIG. 13 is a diagram showing an example of the ratio of the number of usable logic cells to the number of disabled logic cells at a trouble restoring time.

A shortage of logic cells, as shown in FIG. 13, can be removed by configuring a logic circuit in the reconfiguration mechanism 121, based on a combination of each FPGA and each function. Thus, the FPGA 114 as a DSP unit, the FPGA 115 as a DMA controller, and the FPGA 117A as a MPU can operate normally.

Where a fault occurs in the FPGA 112 acting a MPU, the FPGA 112 in the stand-by system controls the reconfiguration mechanism 121 to perform the reconfiguring operation.

In the reconfiguration process in the second aspect where the function can be interchanged between the FPGAs 112, 114, and 115, the first and second table are prepared, like the FPGA 112 acting as a MPU in the third aspect, whereby the logic circuit can be reconfigured by comparing the first table with the second table.

Where the FPGAs 117A and 117B are used according to the third aspect to reconfigure a logic circuit having the same function as the faulty FPGA, the faulty FPGA formed of logic cells, except the faulty logic cell diagnosed by the scan-checking circuit 119, can be used as a spare logic circuit to reconfigure a logic circuit formed of logic cells in number less than usable logic cells by itself.

Figure 14:
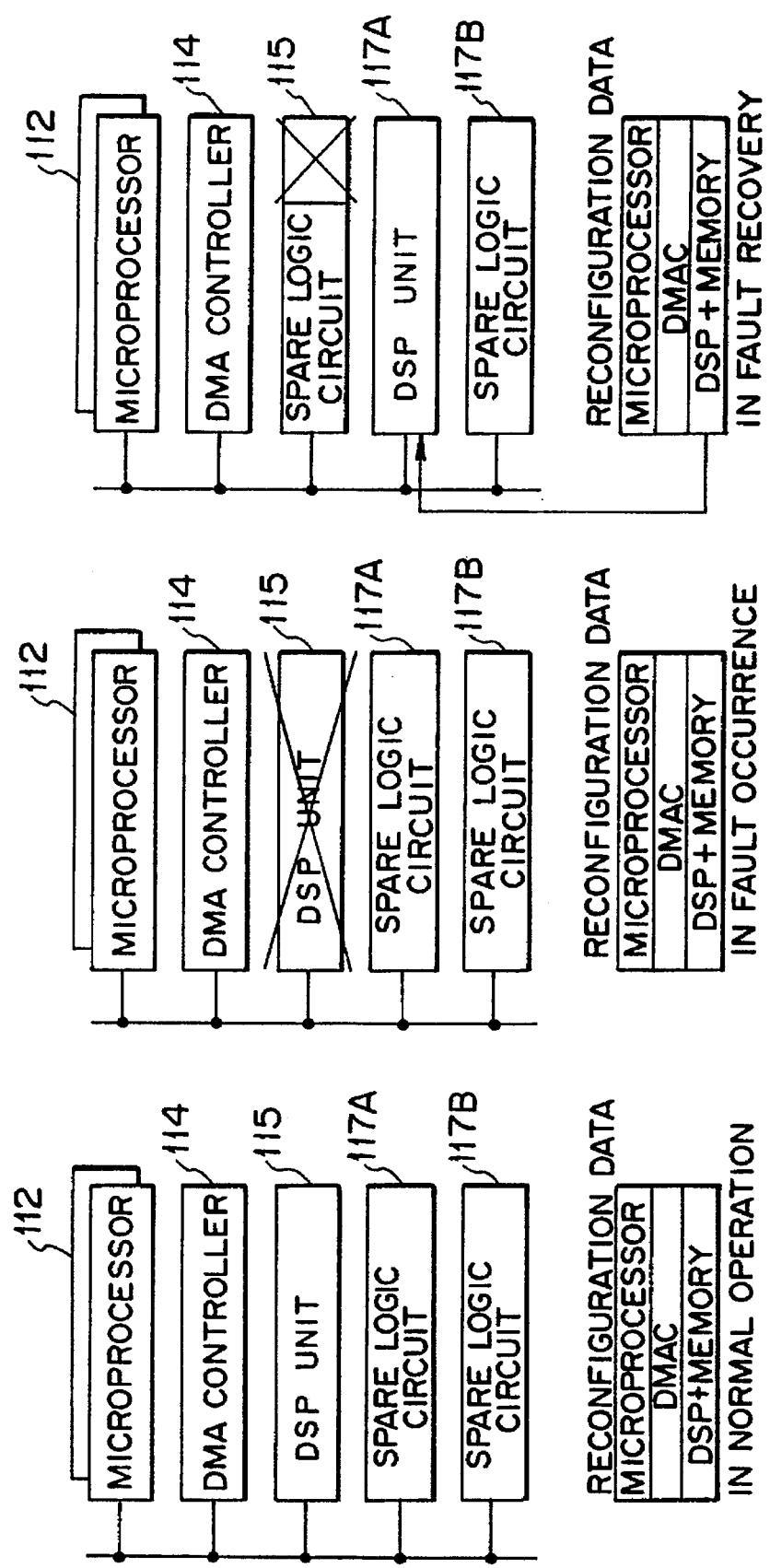
FIG. 14 is a diagram used for explaining that a fault FPGA can be used as a spare logic circuit to reconfigure a logic circuit formed of cells in number less than the number of usable cells in the fault FPGA itself.

For example, where a faulty FPGA 115 acting as a DSP, as shown in FIG. 14, is interchanged with the FPGA 117A, it can be converted into a spare logic circuit to reconfigure a logic circuit having logic cells in number less than the usable logic cells in the faulty FPGA 115.

The operation of the information processing apparatus with self-repair function will be described below with reference to the flow chart shown in FIG. 15.

The fault detecting circuit 111 detects a bus error (step B1), access timeout (step B2) or watchdog timer error (step B3), it outputs a fault detection signal to the MPU 112.

In response to the fault detection signal from the fault detecting circuit 111, the MPU 20 decides whether the resultant fault can be coped with by software (step B4). If it is decided that software can cope with the fault, the fault error routine process can be performed (from step B4 to step B5 via YES route). If it is decided that software cannot cope with the fault, the operation of the information processing system is stopped temporarily (from step B4 to step B6 via NO route).

The FPGA 112 acting as a MPU (a MPU in the spare system when the MPU itself malfunctions) outputs a scan-check designation signal to instruct the scan-checking circuit 119 to scan-check the FPGAs 112, 114, and 115, and then diagnoses the faulty logic cell, based on the scan-check signal from the scan-checking circuit 119, to each FPGA. When a faulty logic cell is diagnosed and specified, the usable flag of the field corresponding to the faulty logic cell in the logic cell table 116A stored in the memory 116 is cleared (step B8). Thus, the MPU 112 controls to designate the fault logic cell in the faulty FPGA as an unusable logic cell.

The MPU 112 also compares the number of usable logic cells in each FPGA, stored in the logic table 116A, with the number of logic cells needed to create a logic circuit with a function, stored in the reconfiguration data holding mechanism 113, and then decides whether usable logic cells are sufficient in number to reconstruct the faulty FPGA (step B9). In other words, it is decided whether the number of still usable logic cells in the faulty FPGA is larger than that of the logic cells needed to reconstruct a logic circuit having the corresponding function.

Figure 15:
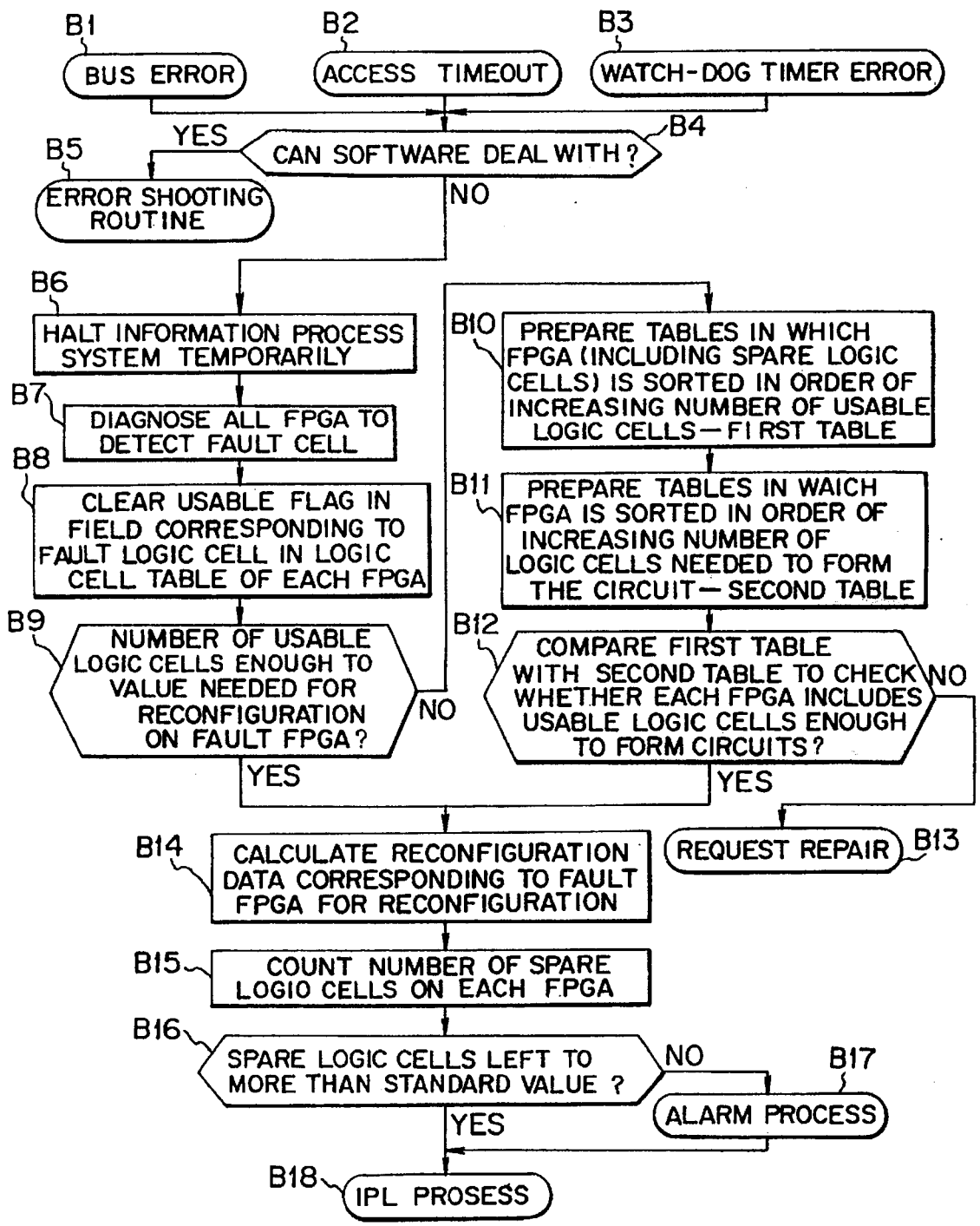
FIG. 15 is a flow chart used for explaining the operation of the second embodiment of the present invention.

If insufficient, the MPU 112 prepares the first table sorted in an increasing order in number of usable logic cells in each FPGA (refer to FIG. 12 and the step B9 to step B10 via NO route in FIG. 15), and prepares the second table sorted in an increasing order in number of logic cells needed to construct a logic cell with each function (refer to FIG. 12 and the steps B11 in FIG. 15).

The MPU 112 also compares the first table with the second table and decides whether each FPGA has usable logic cells needed to construct a circuit thereof (step B12). That is, the MPU 112 also compares the first table with the second table and then decides whether there is a combination satisfying the condition: the number of usable logic cells in all FPGAs>the number of logic cells needed to construct a logic circuit with a function.

Where a comparison of the first table and the second table exhibits the condition: the number of usable logic cells in all FPGAs<the number of logic cells needed to construct a logic circuit with a function, the present apparatus asks the user to begin repairing the faulty FPGA (from step B12 to step B13 via NO route).

In the step B9, where the number of usable logic cells in the faulty FPGA is larger than the number of logic cells needed to construct a logic circuit with the corresponding function (YES route in step B9), a logic circuit is reconfigured using spare logic cells in the faulty FPGA (step B14).

In the step B12, where the comparison result of the first table and the second table exhibits a combination satisfying: the number of usable logic cells in all FPGAs>the number of logic cells needed to construct a logic circuit with a function (YES route in step B12), a logic circuit that has a function designated in the second table is reconstructed to each FPGA in the first table (step B14).

In the reconfiguration process, the MPU 112 calculates the number of spare logic cells on each FPGA after the reconfiguration process (step B15) and compares the number of spare logic cells in each FPGA with the standard value of spare logic cells needed in each FPGA (step B16). Where the number of spare logic cells in each FPGA is smaller than the standard value, an alarm is issued (step B17). If larger, an initial program loading process (IPL process) is performed (step B18). Thus the information processing apparatus is restored.

As described above, according to the second embodiment of the present invention, the information processing apparatus with self-repair function is provided with the FPGAs 112, 114, and 115, the spare logic circuit 117, the reconfiguration data holding mechanism 113, the fault detecting circuit 111, and the reconfiguring mechanism 121. Hence, in order to cope with faults in various components in the information processing apparatus, the faulty component can be automatically reconfigured to regenerate its original normal function. Like the first embodiment, the information processing apparatus can deal with multiple faults and can be made small in size and at a low price.

Since the scan checking circuit 119 is arranged and the faulty FPGA formed of logic cells, except a diagnosed faulty logic cell, can be used as a spare processing circuit, the information processing apparatus can remove multiple faults, with the high reliability maintained.

Moreover, the information processing apparatus includes the memory 116 that stores substitutive use information representing that the FPGAs 117A and 117B each acting as a spare logic circuit are used instead of a fault FPGA, and performs the IPL process at a power-on or reset time after a substitutive use operation, without detecting any fault. Hence this feature contributes to a high reliability of the apparatus.

The FPGA 112 acting as power supply inhibiting means can direct power supply from the unused spare logic circuits 117A and 117B, or the FPGA after a fault occurrence, thus saving the system power consumption.

(d) Explanation of Third Embodiment

Figure 16:
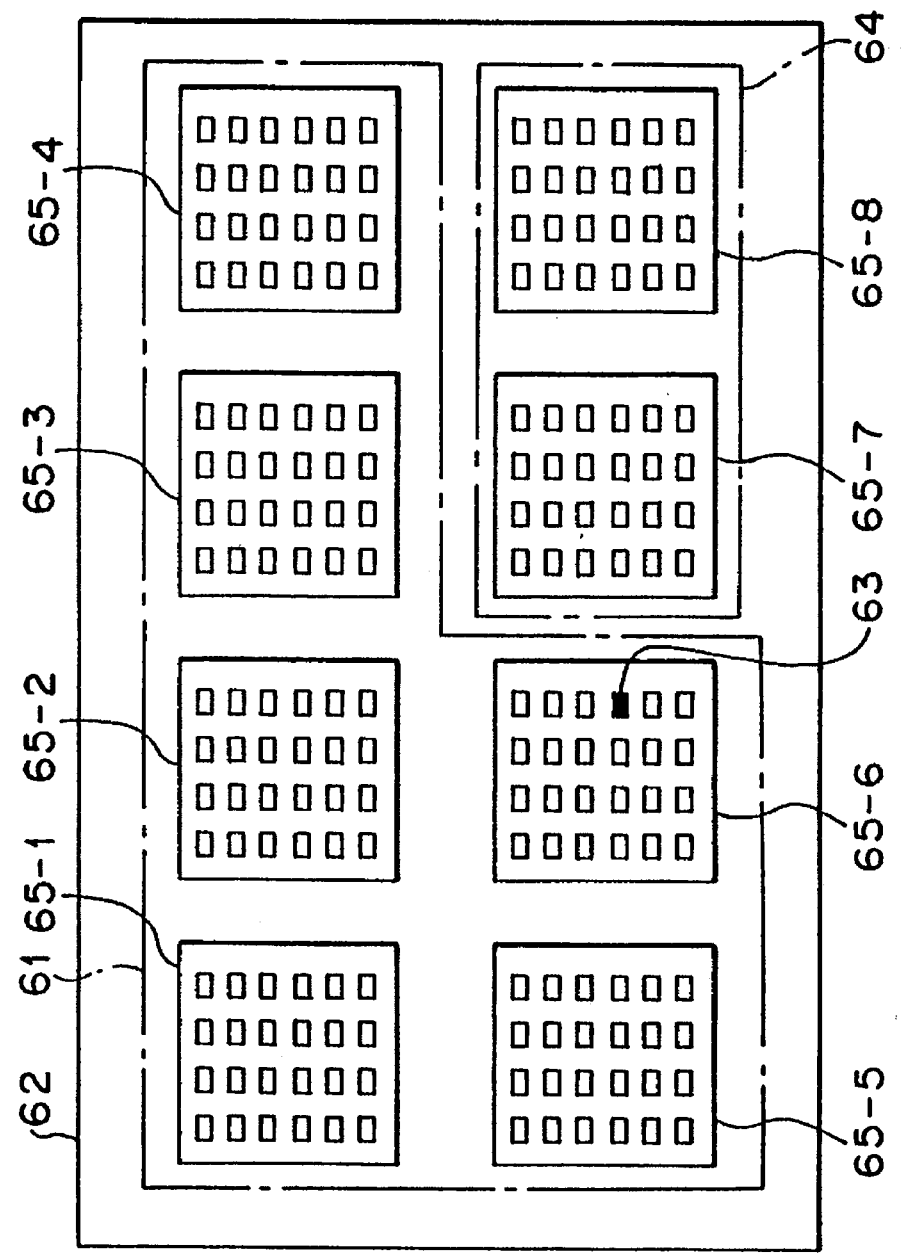
FIG. 16 is a block diagram showing the main portion of the information processing apparatus with self-repair function according to the third embodiment of the present invention.
Figure 17:
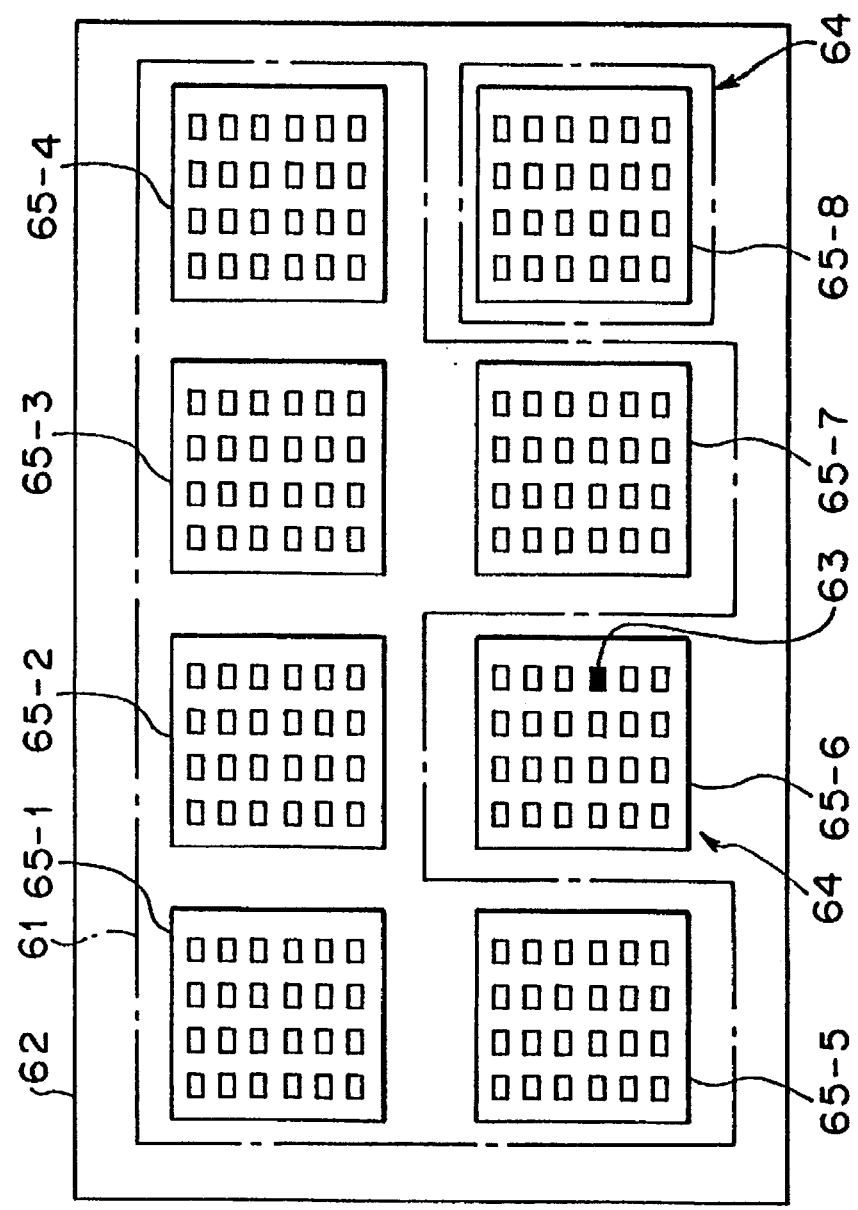
FIG. 17 is a block diagram showing the main portion of the information processing apparatus with self-repair function according to the third embodiment of the present invention.

FIG. 16 is a diagram showing the information processing apparatus with self-repair function according to the third embodiment of the present invention. FIG. 17 is a diagram showing the information processing apparatus with self-repair function according to the third embodiment of the present invention. Like the first and second embodiments, the information processing apparatus according to the present embodiment is mounted, for example, on a scientific observation artificial satellite.

The information processing apparatus shown in FIG. 16 differs from that according to the second embodiment in that the system is formed of units such as printed board units, not an integrated circuit, and the logic processing unit as self repair unit is each of integrated circuits (FPGAS) 65-1 to 65-8, not logic modules.

Referring to FIG. 16, the information process apparatus generally comprises a unit such as a printed board unit 62, a group of integrated circuit groups 61 in operation, a spare integrated circuit group 64, spare integrated circuits 65-7 and 65-8 (spare logic processing units), and a faulty logic cell 63.

Each of the integrated circuits 65-1 to 65-8 includes plural logic modules each formed of plural logic cells and is the minimum component of programmable hardware. The unit 62, for example, is a printed board unit formed of plural (8 in FIG. 16) integrated circuits 65-1 to 65-8.

In the information processing apparatus with self-repair function according to the third embodiment of the present invention, when a fault, as shown in FIG. 16, occurs in the logic cell 63 in the integrated circuit 65-6 within the integrated circuit group 61 in operation, the integrated circuit 65-6 including the faulty logic cell 63, as shown in FIG. 17, is cut off according to the same method as that in the first embodiment.

Then the spare integrated circuit 65-7 is operated together with the integrated circuit group 61 to store the system.

As described above, according to the third embodiment of the present invention, the information processing apparatus with self-repair function includes integrated circuits (FPGAS) 65-1 to 65-8 acting as logic processing units and spare logic processing units. Like the second embodiment, in order to cope with faults in various components in the information processing apparatus, the faulty component can be automatically reconfigured to regenerate its original normal function. The information processing apparatus can deal with multiple faults and can be made in small and at low price.

According to the present embodiment, the spare integrated circuits 65-7 and 65-8 are arranged. If a fault occurs in logic cells of the integrated circuits 65-1 to 65-6, the spare integrated circuits 65-7 to 65-8 are used to restore a faulty system, according to the same method as that in the second embodiment. However, the present invention should not be limited to the present embodiment. For example, spare logic cells (spare logic forming elements) may be arranged in each of the integrated circuits 65-1 to 65-6. Like a method similar to the first embodiment, the faulty integrated circuit can be reconfigured using a faulty spare logic cell.

(e) Explanation of Fourth Embodiment

Figure 18:
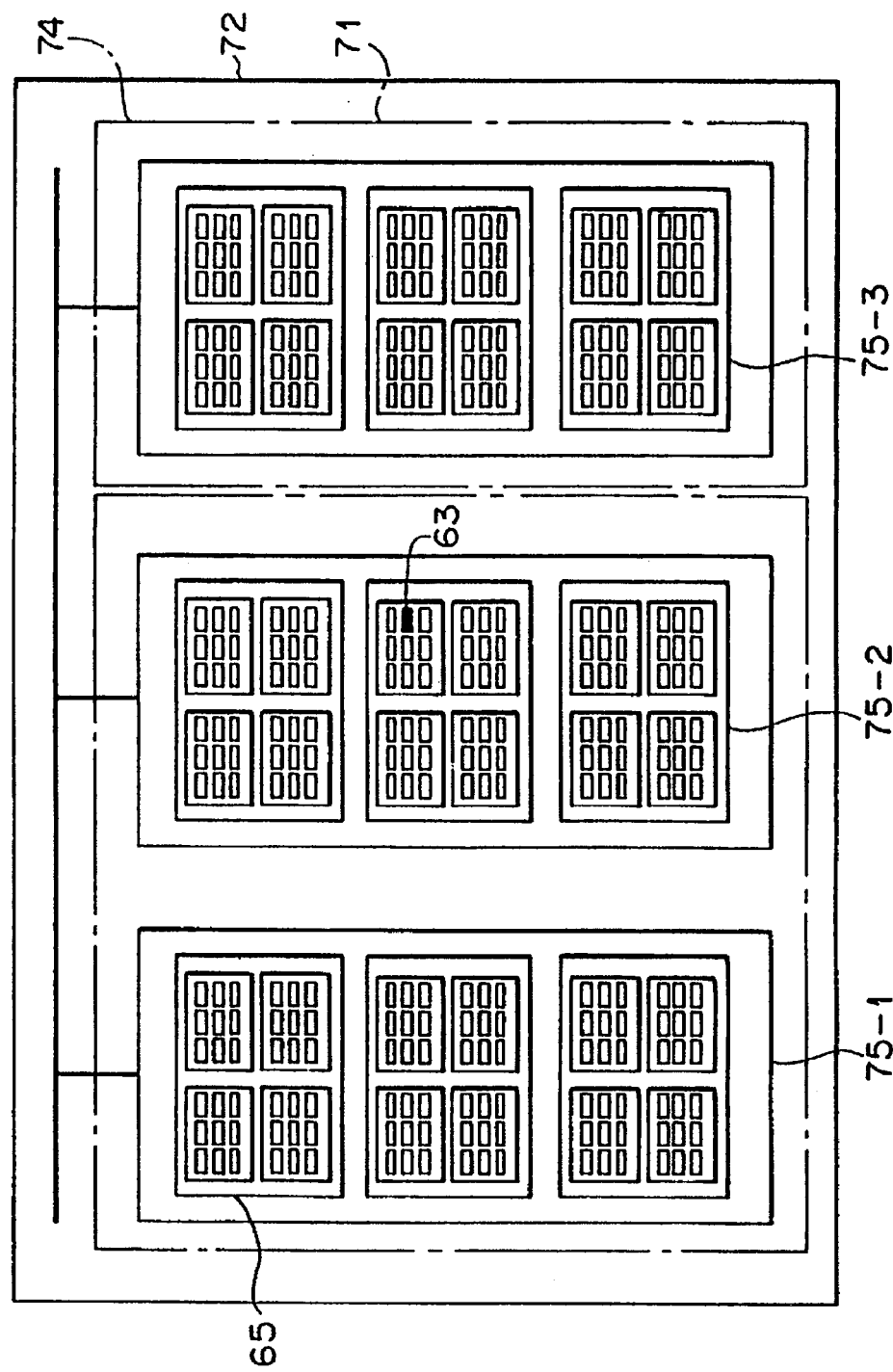
FIG. 18 is a block diagram showing the main portion of the information processing apparatus with self-repair function according to the fourth embodiment of the present invention.
Figure 19:
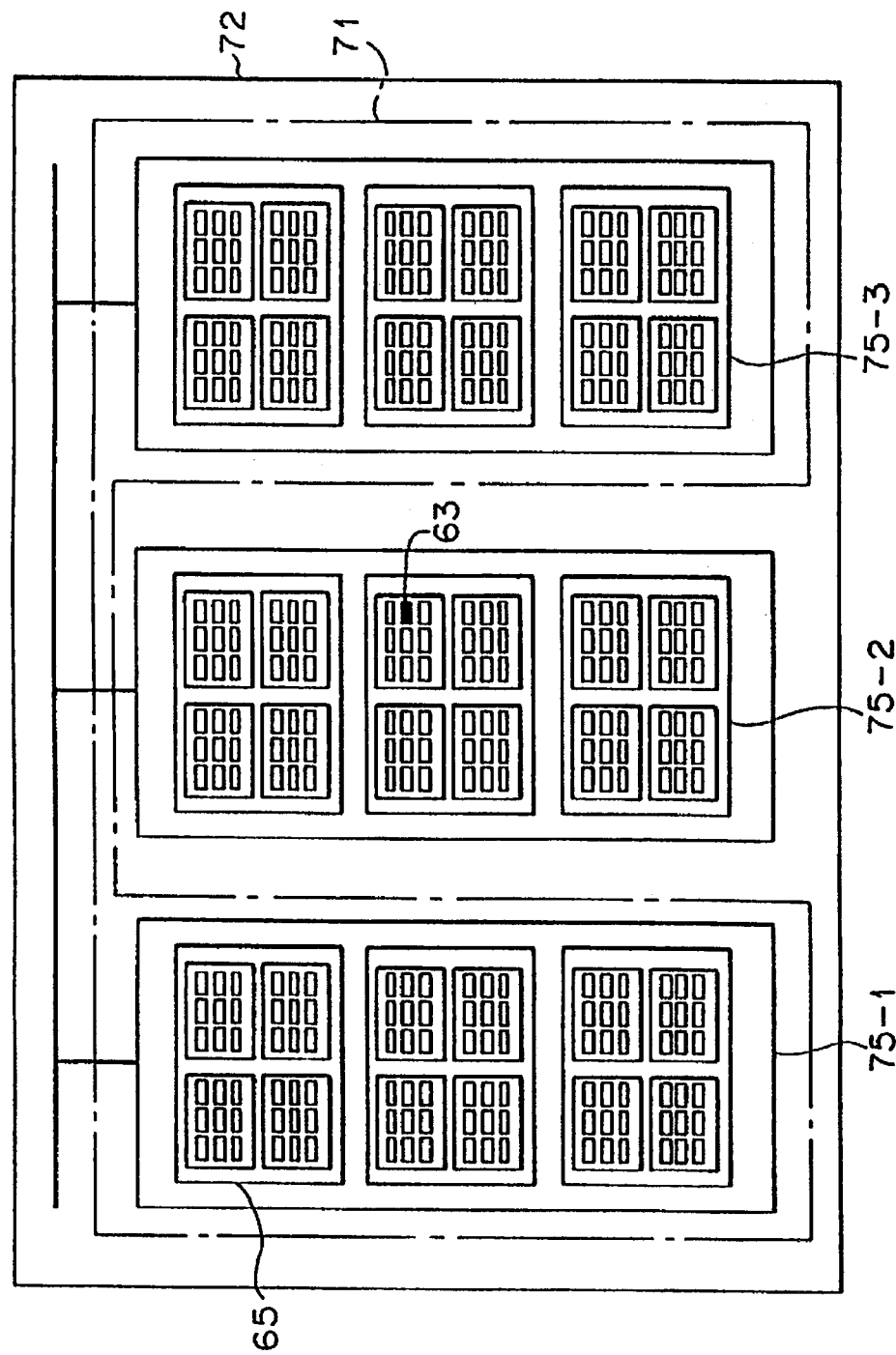
FIG. 19 is a block diagram showing the main portion of the information processing apparatus with self-repair function according to the fourth embodiment of the present invention.

FIG. 18 is a diagram showing the information processing apparatus with self-repair function according to the fourth embodiment of the present invention. FIG. 19 is a diagram showing the information processing apparatus with self-repair function according to the fourth embodiment of the present invention. Like the first to third embodiments, the information processing apparatus according to the present invention is mounted, for example, on a scientific observation artificial satellite.

Unlike the first to third embodiments, the information processing apparatus shown in FIG. 18 is formed of an information processor each formed of plural units, not a single unit. The self-repair logic processing units are formed of units 75-1 to 75-3, not integrated circuits, respectively.

In FIG. 18, the information processing apparatus generally comprises a programmable information processor 72 formed of plural units 75-1 to 75-3, a unit group 71 in operation formed of units 75-1 and 75-2, a spare unit group 74 formed of a unit (spare logic processing unit) 75-3, an integrated circuit 65 (FPGA), and a faulty logic cell 63.

The integrated circuits 65 have the same function as those in the third embodiment and the logic cells 63 have the same function as those in the third embodiment.

In the information processing apparatus of the fourth embodiment of the present invention, when a fault occurs in the logic cell 63 in the units 75-2 in the unit group 71 in operation, as shown in FIG. 18, the unit 75-2 including the logic cell 63 is cut off according to the same method as that in the second embodiment. The fault is removed by operating the spare unit 75-3 together with the unit group 71 in operation.

The information processing apparatus of the fourth embodiment of the present invention includes logic processing units and the units 75-1 to 75-3 acting as spare logic processing units. To cope with faults of various components in the information processing apparatus, like the second and third embodiments, the faulty component is automatically reconstructed to regenerate the original normal function thereof. Thus, multiple faults can be removed and the information processing apparatus can be made small in size and at a low price.

According to the above embodiment, the information processing apparatus includes the spare unit 75-3. A fault occurring in a logic cell in the unit 75-1 or 75-2 can be removed using the spare unit 75-3, according to the same method as that in the second embodiment. However, without limiting the above embodiment, spare logic cells (spare logic forming elements) may be prepared in the unit 75-1 or 75-2. Thus, according to the same method as that in the first embodiment, the faulty unit can be reconfigured using the spare logic cells at a fault occurrence time.

(f) Explanation of Fifth Embodiment

Figure 20:
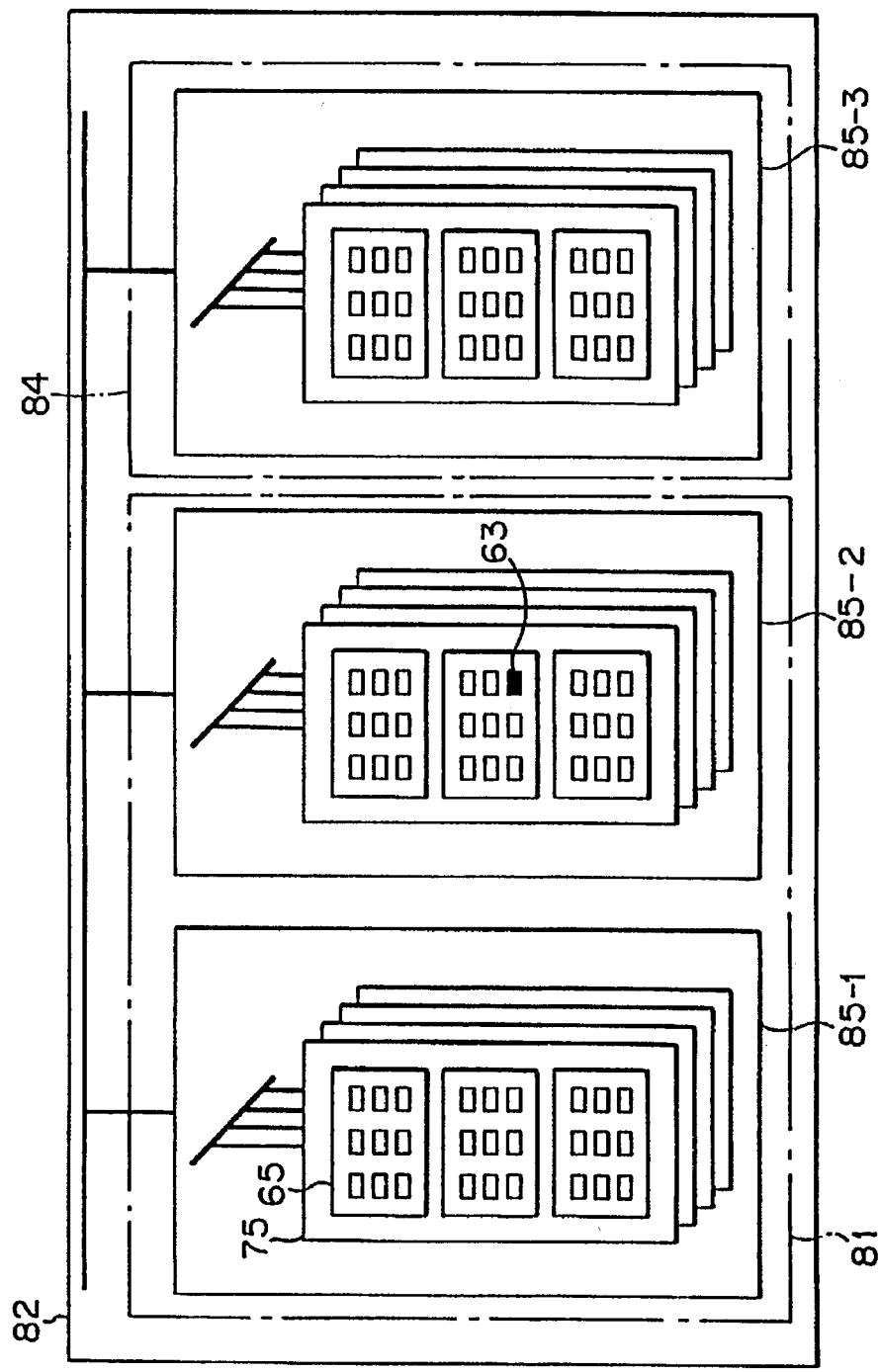
FIG. 20 is a block diagram showing the main portion of the information processing apparatus with self-repair function according to the fifth embodiment of the present invention.
Figure 21:
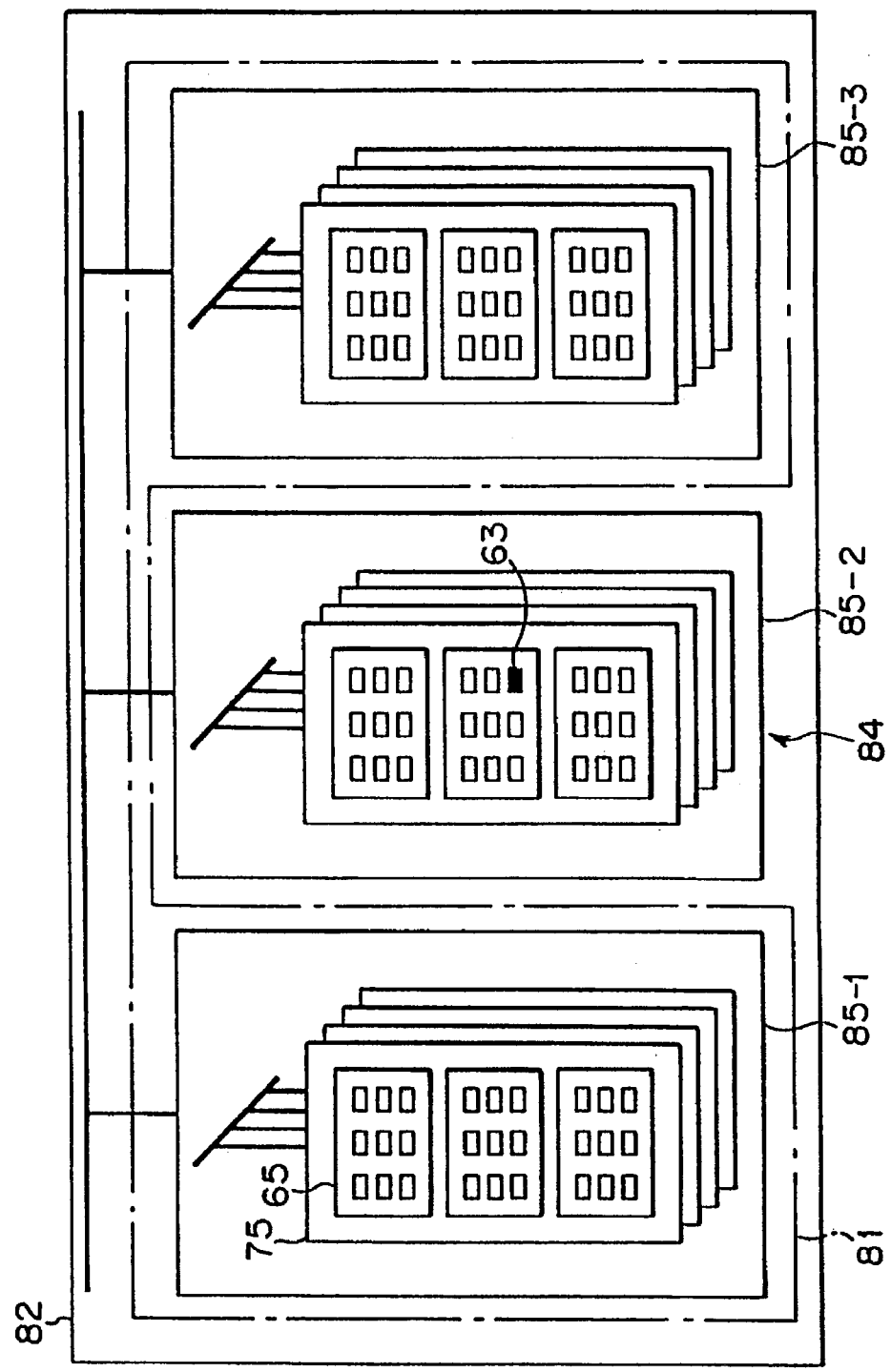
FIG. 21 is a block diagram showing the main portion of the information processing apparatus with self-repair function according to the fifth embodiment of the present invention.

FIG. 20 is a diagram showing an information processing apparatus with self-repair function according to the fifth embodiment of the present invention. FIG. 21 is a diagram showing an information processing apparatus with self-repair function according to the fifth embodiment of the present invention. Like the first to fourth embodiments, the information processing apparatus of the present embodiment is mounted, for example, on scientific observation artificial satellite.

Unlike the third and fourth embodiments, the information processing apparatus shown in FIG. 20 includes plural computing system formed of plural information processors, not of units or an information processor. The self-repair logic processing unit is formed of information processors 85-1 to 85-3, not of integrated circuits or units.

Referring to FIG. 20, the information processing apparatus generally comprises a programmable computing system 82 formed of plural information processors 85-1 to 85-3, an information processing group 81 in operation formed of information processors 85-1 and 85-2, a spare information processor group 84 formed of spare information processors (spare logic processors) 85-3, a unit 75, an integrated circuit 65 (FPGA), and a faulty logic cell 63.

Information processors 85-1 to 85-3 are programmable hardware formed of plural units 75.

The unit 75, the integrated circuit 65, and the logic cell 63 function similarly to the corresponding components in the third and fourth embodiments.

In the information processing apparatus with self-repair function according to the fifth embodiment of the present invention, when a fault occurs in the logic cell 63 within the information processor 85-2 included in the information processor group 81 in operation, the information processor 85-2 including the logic cell 63, as shown in FIG. 21, is cut off according to the same method as that in the second embodiment. Then the fault can be removed by operating the spare information processor 85-3 added to the information processor group 81.

The information processing apparatus with self-repair function according to the fifth embodiment of the present invention includes information processors 85-1 to 85-3 acting as logic processing units and spare logic processing units. Thus like the second to fourth embodiments, in order to cope with faults of components occurring in the information processing apparatus, the faulty component can be automatically reconstructed to regenerate the original normal function. As a result, the information processing apparatus can deal with multiple faults and be small in size and low in price.

The spare information processor 85-3 is arranged according to the present embodiment. A fault occurring in a logic cell in the information processor 85-1 or 85-2 is removed using the spare information processor 85-3, according to the same method as that in the second embodiment. However, the present invention should not be limited only to the above embodiment. Spare logic cells (spare logic forming elements), for example, may be arranged in the information processor 85-1 or 85-2. Like the first embodiment, the faulty information processor can be reconstructed, using the spare logic cells at a fault occurrence time.

(g) Explanation of Sixth Embodiment

Figure 22:
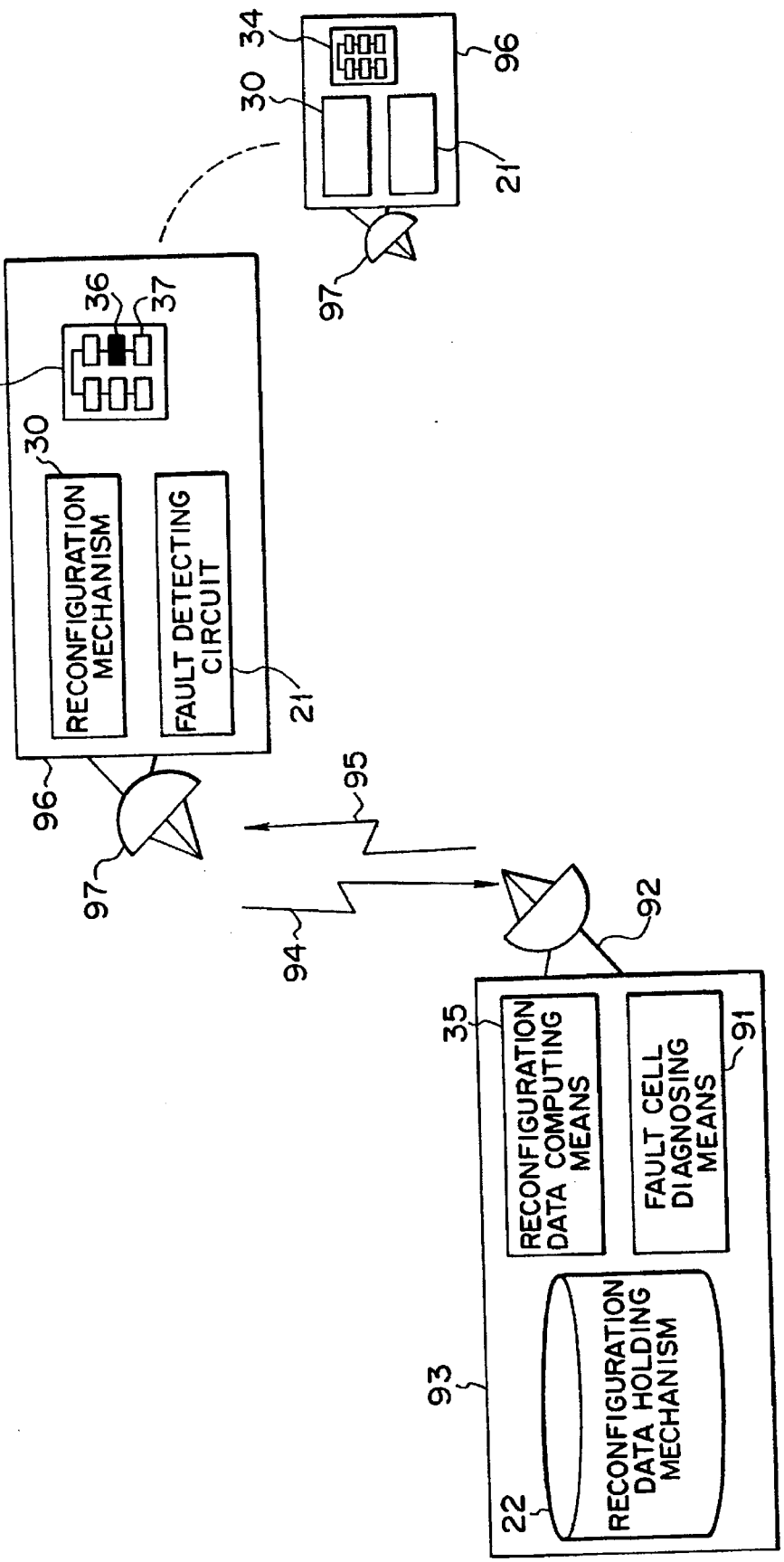
FIG. 22 is a block diagram showing the main portion of the information processing apparatus with self-repair function according to the sixth embodiment of the present invention.
Figure 23:
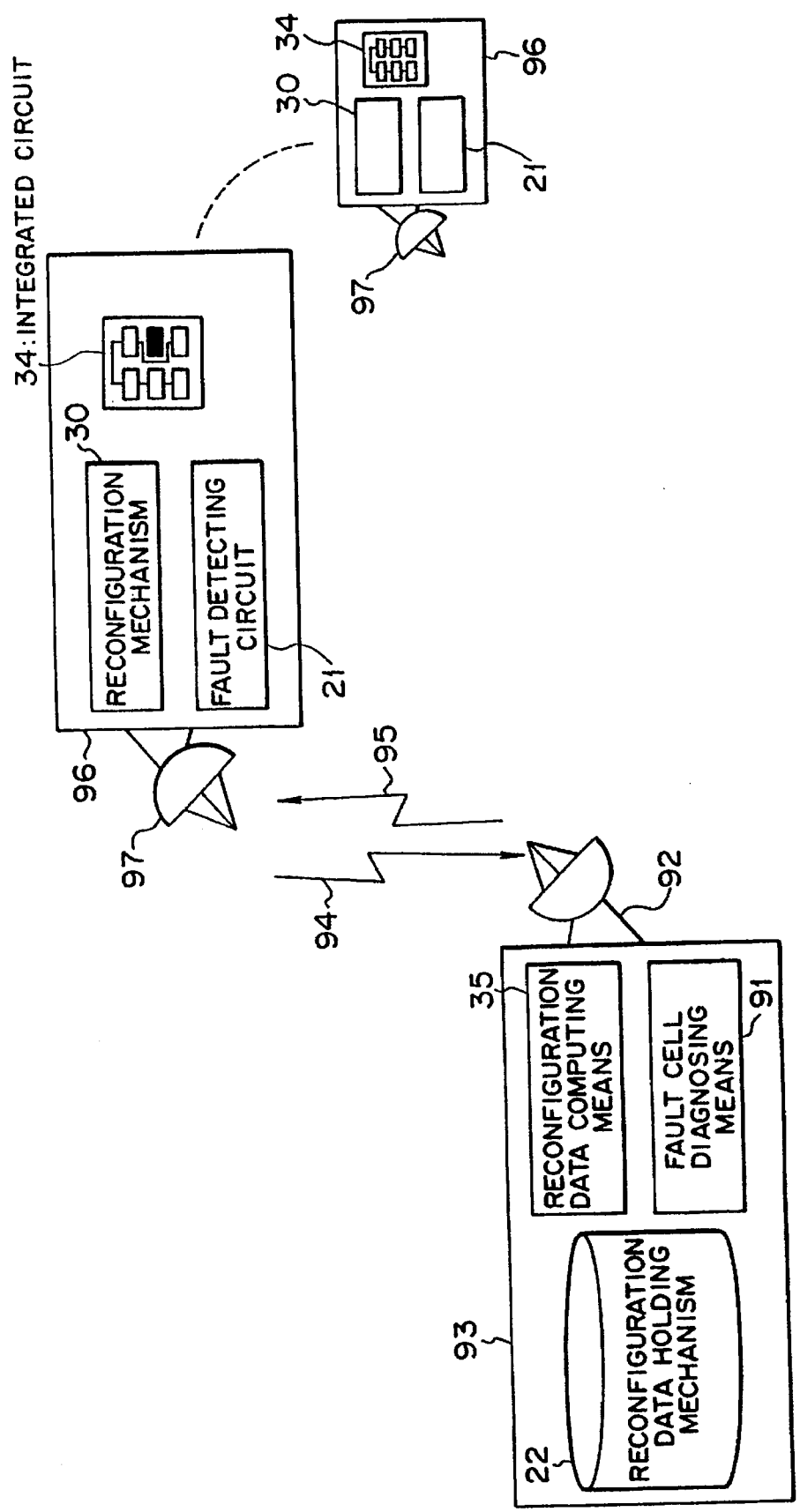
FIG. 23 is a block diagram showing the main portion of the information processing apparatus with self-repair function according to the sixth embodiment of the present invention.

FIG. 22 is a diagram showing information processing apparatus with self-repair function according to the sixth embodiment of the present invention. FIG. 23 is a diagram showing information processing apparatus with self-repair function according to the sixth embodiment of the present invention. The information processing apparatus can be suited, for example, for use in a scientific observation artificial satellite.

Unlike the first embodiment, the information processing apparatus shown in FIG. 22 adds a fault detecting circuit 21 and a reconfiguration mechanism 30 to each FPGA 34, with plural FPGAs (integrated circuits) 34 arranged as a logic processing unit. Moreover, the reconfiguration data holding mechanism 22 acts as data holding means, the faulty cell diagnosis means 91 acts as a faulty logic element diagnosis means, and the reconfiguration data computing means 35 are connected in common to the plural FPGAs 34. The fault detection signal is interchanged with reconfiguration data by means of radio linking. In the figures, like numerals represent elements corresponding functionally to elements in the first embodiment.

Hence, the first information processing apparatus 93 consists of the reconfiguration data holding mechanism 22, the reconfiguration data computing means 35, and the faulty cell diagnosis means 91. The second information processing apparatus 96 consists of the fault detecting circuit 21 and the reconfiguring mechanism 30, and the FPGA 34.

The first information processing apparatus 93 is remotely installed to the second information processing apparatus 96. The first information processing apparatus 93 includes communications means 92 to communicate wirelessly with the second information processing apparatus 96. Similarly, the second information processing apparatus 96 includes communications means 97. Thus mutual radio communications is established between the first information processing apparatus 93 and the second information processing apparatus 96.

In the first information processing apparatus 93, the faulty cell diagnosis means 91 functions as the scan checking circuit 57 in the first embodiment. When receiving a fault diagnosis designation signal 94 acting as a fault detection signal from the fault detection circuit 21 via the communication means 92, the faulty cell diagnosis means 91 diagnoses and specifies a faulty logic cell in the FPGA 34.

The communication means 97 transmits the fault diagnosis designation signal 94 from the fault detecting circuit 21 in the second information processing apparatus 96 and receives reconfiguration data 95 calculated in the reconfiguration data computing means 35 sent from the communication means 92.

As described above, according to the sixth embodiment of the present invention, when the fault detecting circuit 21 detects the logic cell 36 troubled in the FPGA 34 in the second information processing unit 96, the communication means 97 transmits wirelessly the fault diagnosis designation signal 94 to the faulty cell diagnosis means 91 in the first information processing apparatus 93. When the reconfiguration data computing means 35 calculates reconfiguration data 95 according to data from the diagnosis result from the faulty cell diagnosis means 91 and the reconfiguration data based on data from the reconfiguration data holding mechanism 22, the communication means 92 transmits wirelessly the data 95 to the reconfiguring mechanism 30 in the second information processing apparatus 96. Other operations are basically similar to those in the first embodiment.

As shown in FIG. 23, even if the logic cell 36 in the FPGA 34 is troubled, the FPGA 34 is reconfigured using the spare logic cells 37 by interchanging signals between the first information processing apparatus 93 and the second information processing apparatus 96 so that the fault can be removed.

In the information processing apparatus with self-repair function according to the sixth embodiment of the present invention, the reconfiguration data holding mechanism 22, the faulty cell diagnosis means 91, and the reconfiguration data computing means 35 are arranged in common to plural FPGAs (second information processing apparatus 96) 34. As a result, the system installation realizes the information processing apparatus in a small space and at a low price. Moreover, the functions of the information processing apparatus remotely separated can improve the freedom in system design.

According to the present embodiment, the spare logic cells (spare logic forming elements) 37 exist in the FPGA 34 within the second information processing apparatus 96. Like the first embodiment, the faulty FPGA is reconfigured using the spare logic cells. However, this invention should not be limited only to the above embodiment. For example, the first information processing apparatus may include a spare FPGA acting as a spare logic processing unit. A fault occurring in a logic cell in the FPGA 34 can be removed using the spare FPGA, according to the same method as that in the second embodiment.

(h) Explanation of Seventh Embodiment

Figure 24:
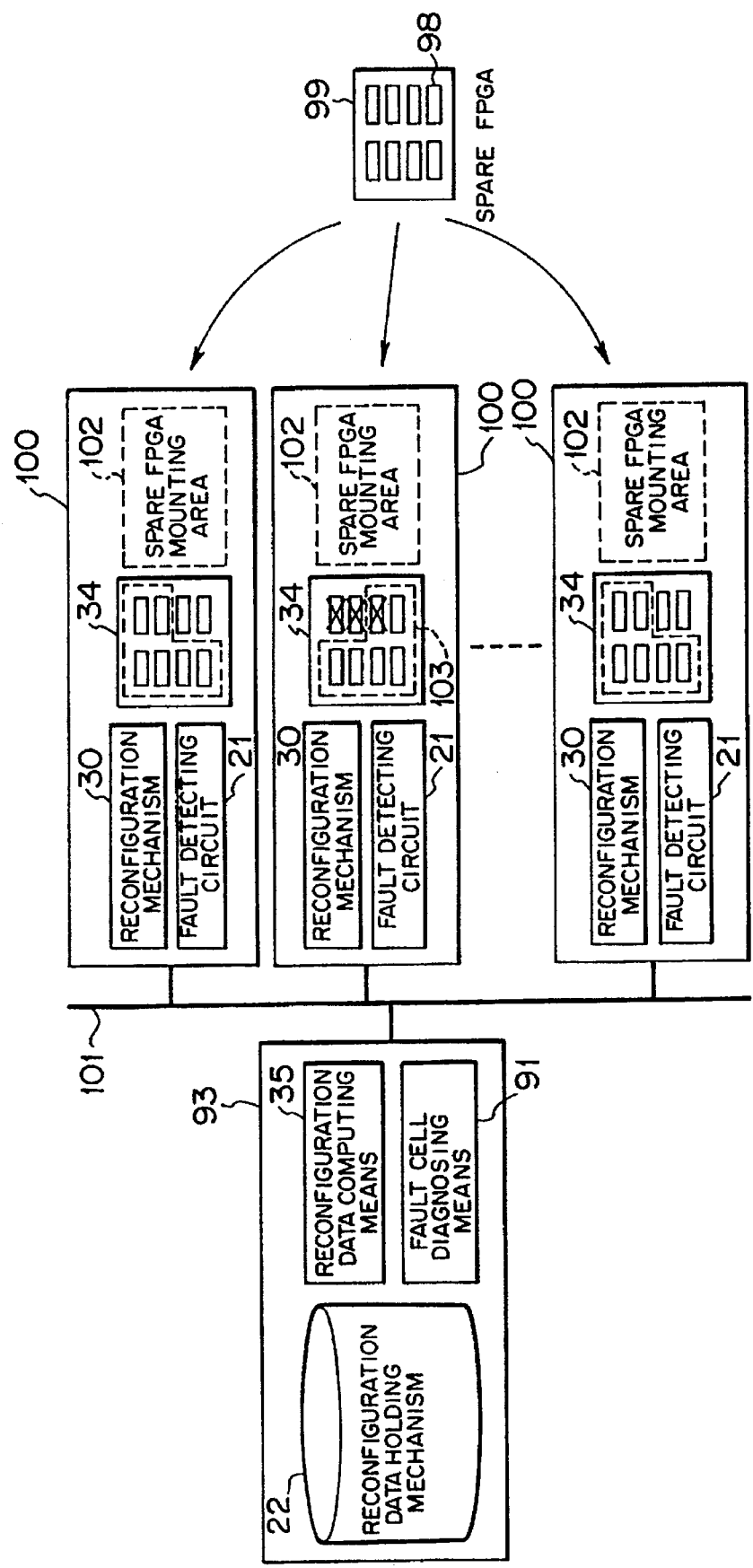
FIG. 24 is a block diagram showing the main portion of the information processing apparatus with self-repair function according to the seventh embodiment of the present invention.
Figure 25:
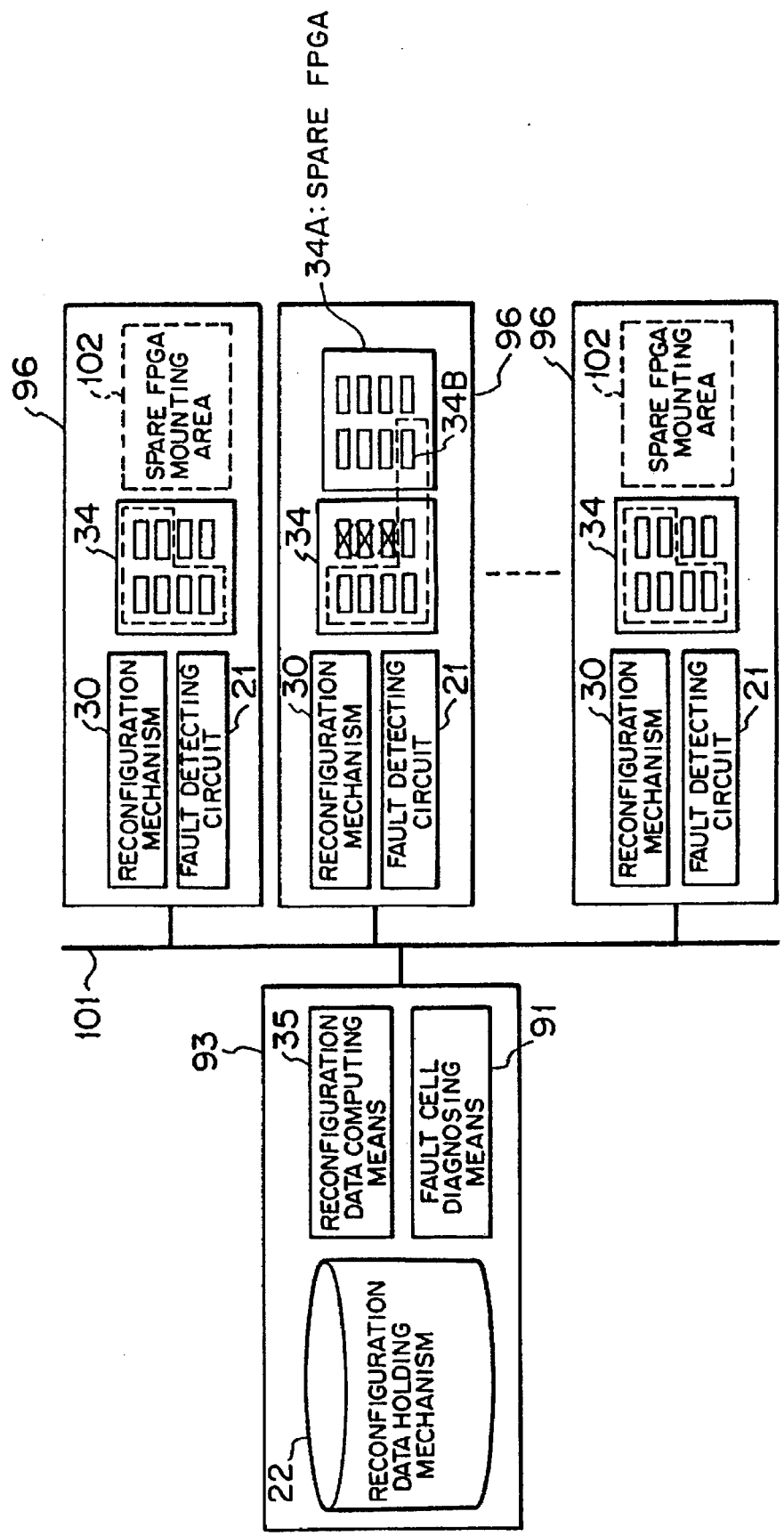
FIG. 25 is a block diagram showing the main portion of the information processing apparatus with self-repair function according to the seventh embodiment of the present invention.

FIG. 24 is a diagram showing the information processing apparatus with self-repair function according to the seventh embodiment of the present invention. FIG. 25 is a diagram showing the information processing apparatus with self-repair function according to the seventh embodiment of the present invention. The information processing apparatus according to the present embodiment also is mounted, for example, on scientific observation satellites.

Unlike the first embodiment, having plural FPGAs (integrated circuits) 34 acting as logical processing units, the information processing apparatus of the present embodiment includes a fault detecting circuit 21 and a reconfiguration mechanism 30, arranged in each FPGA 34. The information processing apparatus also uses the reconfiguration data holding mechanism 22 as a data holding means, the faulty cell diagnosis means 91 as a faulty logic element diagnosis means, and the reconfiguration data computing means 35 are arranged in common to plural FPGAs 34. In the figures, like numerals indicate like functions in the first embodiment.

Therefore like the sixth embodiment according to the present embodiment, the second information processing apparatus 100 comprises the fault detecting circuit 21, the reconfiguration mechanism 30, and the FPGA 34. The first information processing apparatus 93 comprises the reconfiguration data holding mechanism 22, the reconfiguration data computing means 35, and the faulty cell diagnosis means 91.

The communication means 101 establishes the mutual communications between the first information processing apparatus 93 and the second information apparatus 100. The second information processing apparatus 100 includes a spare FPGA assembly region 102 used to assemble the spare FPGA 99 (to be described).

Unlike the above-mentioned embodiments, in the information according to the present invention, the spare logic cell 98 is added from outside the FPGA 34, according to reconfiguration data calculated by means of the reconfiguration data computing means 35 at a fault occurrence time in the FPGA 34.

The spare FPGA 99 includes spare logic cells 98 that can be used in common to the FPGA 34 in the second information processing apparatus 100. When a fault occurs in the FPGA 34 in the second information processing apparatus 100, the spare FPGA 99 is added and assembled externally to the spare FPGA assembly region 102, whereby the fault can be removed.

In the second information processing apparatus 100, numeral 104 represents a current faulty logic cell, 105 represents two faulty logic cells, and 103 represents a logic cell group in operation after removing the fault.

The operation of the information processing apparatus according to the seventh embodiment of the present invention will be described below with reference to the FIGS. 24 and 25.

As shown in FIG. 24, if the repaired logic cell group 103 in operation, except the two defect logic cells 105, is troubled again, the fault detecting circuit 21 detects the fault. Then the faulty cell diagnosis means 91 diagnoses and specifies the fault logic cell 104.

When the faulty cell diagnosis means 91 specifies the third unusable logic cell 104 in the FPGA 34, it decides that the reconfiguration data computing means 35 in the first information processing apparatus 93 cannot remove the fault by using the spare logic cell inside the FPGA 34.

On the contrary, as shown in FIG. 25, the spare FPGA 99 is added to the spare FPGA assembly region 102. Then the reconfiguration data computing means 35 calculates reconfiguration data, using the spare logic cell 34B in the added FPGA 34A, based on data from the reconfiguration data holding mechanism 22 and a diagnosis result from the faulty cell diagnosis means 91.

The reconfiguration data calculated in the reconfiguration data calculating means 35 is transmitted to the reconfiguration mechanism 30 via the communications means 101. Thus the fault can be removed by means of the reconfiguration mechanism 30.

According to the information processing apparatus according to the seventh embodiment of the present invention, the reconfiguration data holding mechanism 22, the faulty cell diagnosis means 91, and the reconfiguration data computing means 35 are arranged in common to plural FPGAs 34. The spare logic cell 98 added externally provides the advantage obtained by the sixth embodiment. Moreover, even if the same FPGA are troubled several times, the system can be recovered with high reliability maintained. Hence the self-repair function can be improved sharply.

According to the present invention, the spare FPGA 99 includes spare logic cells (spare logic forming elements) 98. Like the first embodiment, spare logic cells are used to reconstruct the faulty FPGA at a fault occurrence time. However, the present invention should not be limited to above embodiment. For example, spare FPGAs are arranged as spare logic processing units. Where a logic cell in the FPGA 34 is troubled, the spare FPGA can be used to remove the fault, according to the same method as that in the second embodiment.

(i) Explanation of Eighth Embodiment

Figure 26:
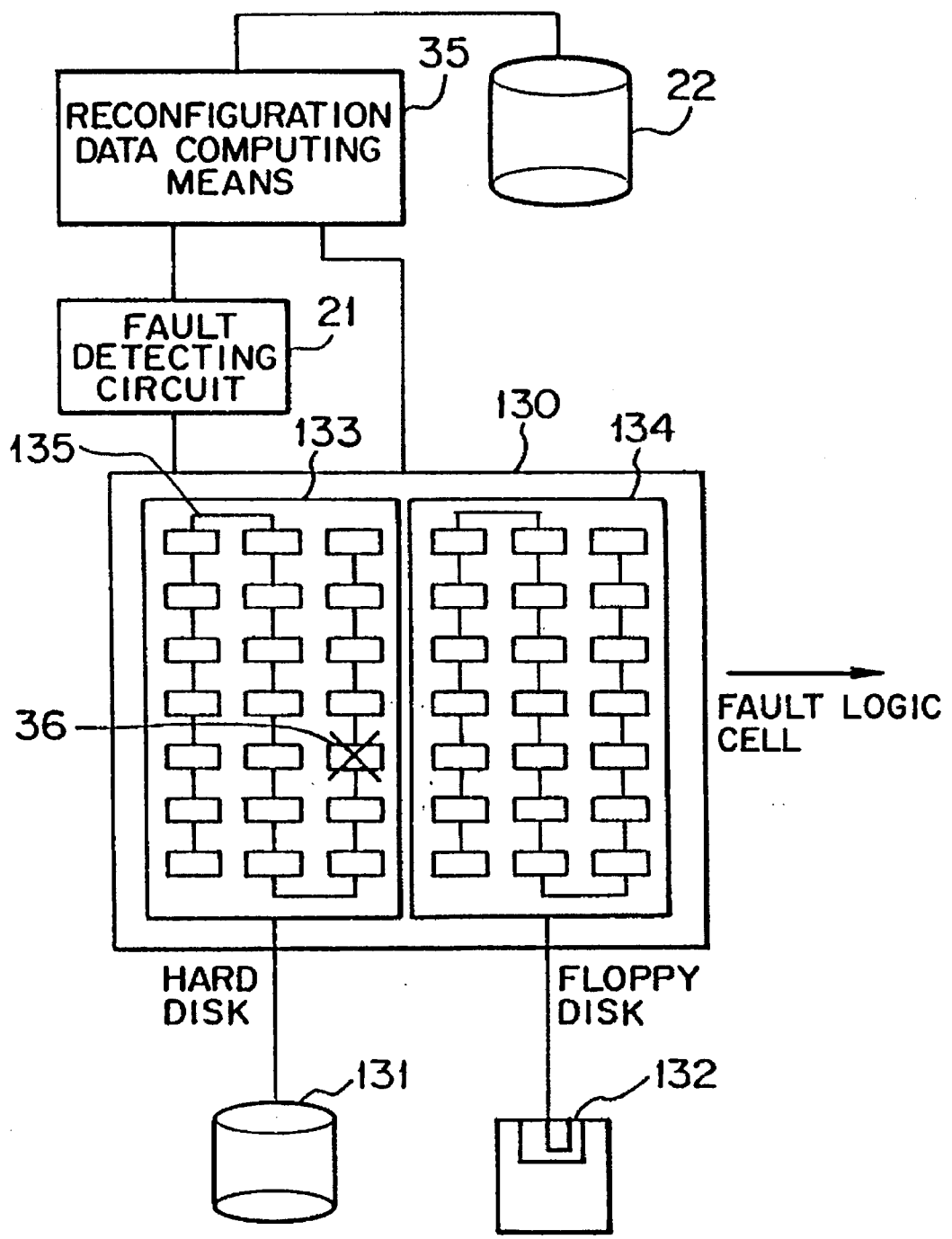
FIG. 26 is a block diagram showing the main portion of the information processing apparatus with self-repair function according to the eighth embodiment of the present invention.
Figure 27:
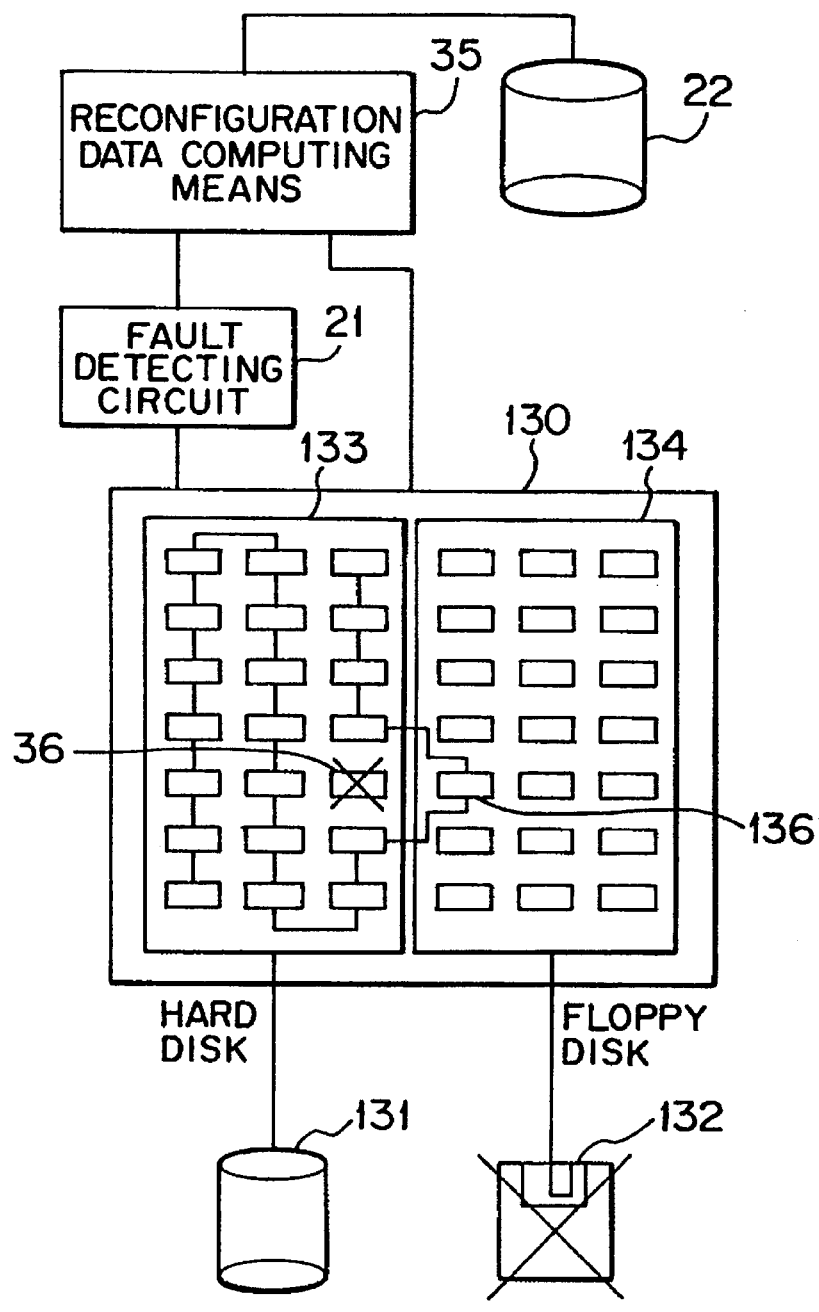
FIG. 27 is a block diagram showing the main portion of the information processing apparatus with self-repair function according to the eighth embodiment of the present invention.

FIG. 26 is a diagram showing the information processing apparatus with self-repair function according to the eighth embodiment of the present invention. FIG. 27 is a diagram showing the information processing apparatus with self-repair function according to the eighth embodiment of the present invention. Unlike the first embodiment, where plural logic modules acting as logic processing units are arranged on integrated circuits (FPGAs), the information processing apparatus according to the present embodiment can use logic cells as spare logic cells (spare logic forming elements) in the logic modules, except the faulty logic module.

As shown in FIGS. 26 and 27, the information processing apparatus according to the present invention can be applied, for example, to an external memory control unit installed for a computer. Referring to FIGS. 26 and 27, numeral 130 represents an integrated circuit (FPGA). The integrated circuit 130 includes two logic modules 133 and 134 each acting as a logic processing unit.

The logic module 133 is formed as a hard disk controller to control the hard disk 131. The logic module 134 is formed as a floppy disk controller to control the floppy disk 132. Numeral 135 represents a logic path interconnecting logic cells in the logic module 133.

The floppy disk 132 is used only when software is introduced into a computer and has a low use frequency at a normal operation. The hard disk 131 holds a computer start-up software and data to be processed, and typically has a high use frequency.

The integrated circuit 130 shown in FIG. 26 includes all the logic cell in use, thus having no spare logic cells. Where the logic module 133 is troubled during a computer's operation, logic cells of the logic module 134 with low use frequency are used as spare logic cells. Thus, even if the floppy disk controller 134 is disabled because of the use of the logic cells as spare logic cells therein, the actual operation is not affected because of its low use frequency.

In FIGS. 26 and 27, the fault detecting circuit 21, the reconfiguration data holding mechanism 22, and the reconfiguration data computing means 35 have the same functions as those in the first embodiment, respectively. The faulty logic element diagnosis means that diagnoses a faulty logic cell in a faulty logic module and the reconfirming mechanism that reconfigures, based on the reconfiguration data calculated by means of the reconfiguration data computing means 35, are not shown in the figures.

In the information processing apparatus with self-repair function according to the eighth embodiment of the present invention, the fault detecting circuit 21 shown in FIG. 26, for example, detects that a fault occurs in the logic cell 36 of the logic module 133, the reconfiguration data computing means 35 calculates reconfiguration data, based on data in the reconfiguration data holding mechanism 22, using as a spare logic cell the logic cell 136 in the logic module 134, instead of a logic cell in the logic module 133.

Thus, as shown in FIG. 27, the logic module 133 can be reconfigured to remove the fault. The logic path 135 is connected to the logic cell 136 in the logic module 134.

In the information processing apparatus with self-repair function according to the eighth embodiment of the present invention, plural logic modules 133 and 134 can realize the flexible self-repair function, based on the system operational priority order of the function of each logic module, using logic cells in a logic module except a faulty logic module.

(j) Explanation of Ninth Embodiment

Figure 28:
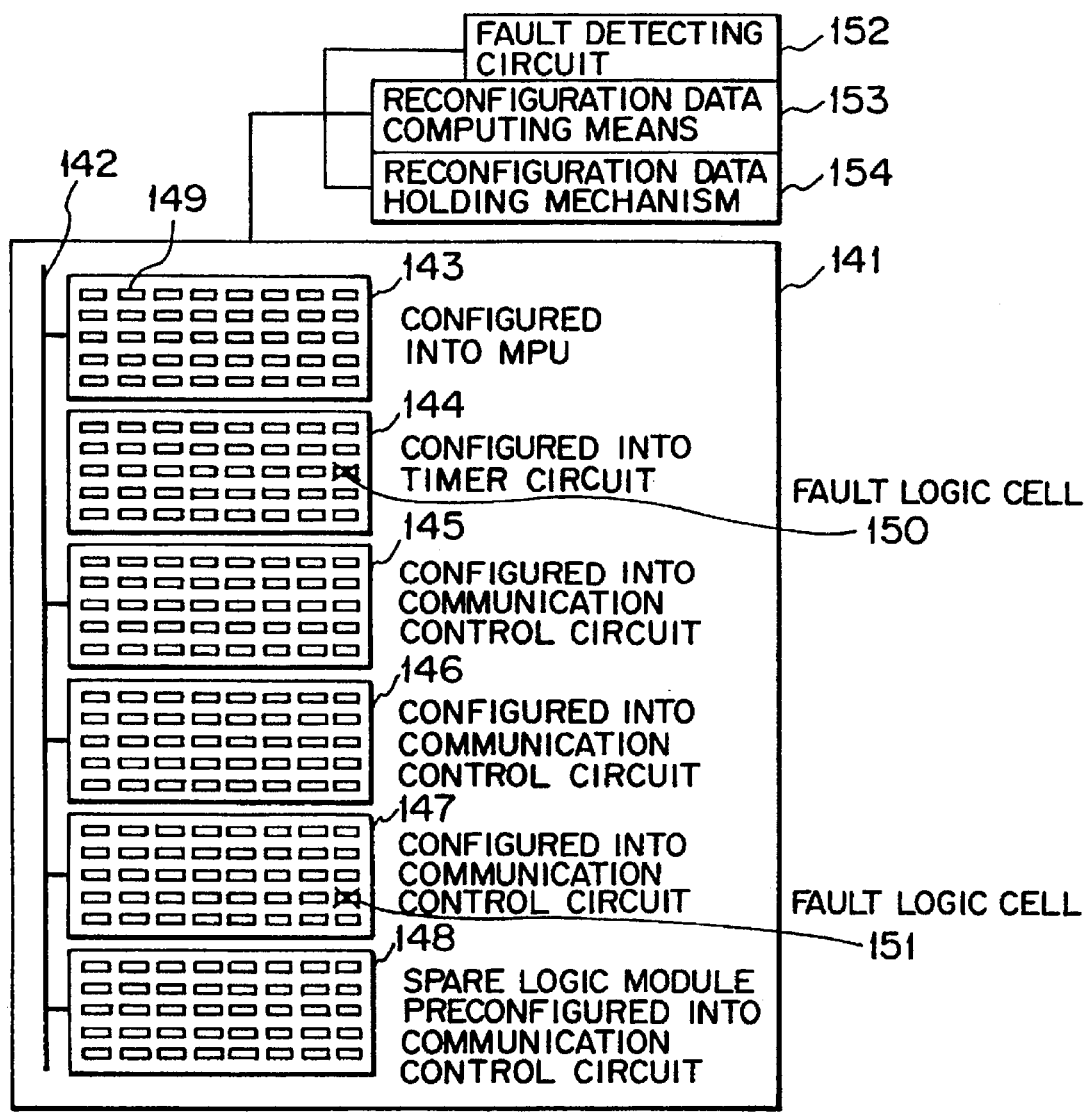
FIG. 28 is a block diagram showing the main portion of the information processing apparatus with self-repair function according to the ninth embodiment of the present invention.
Figure 29:
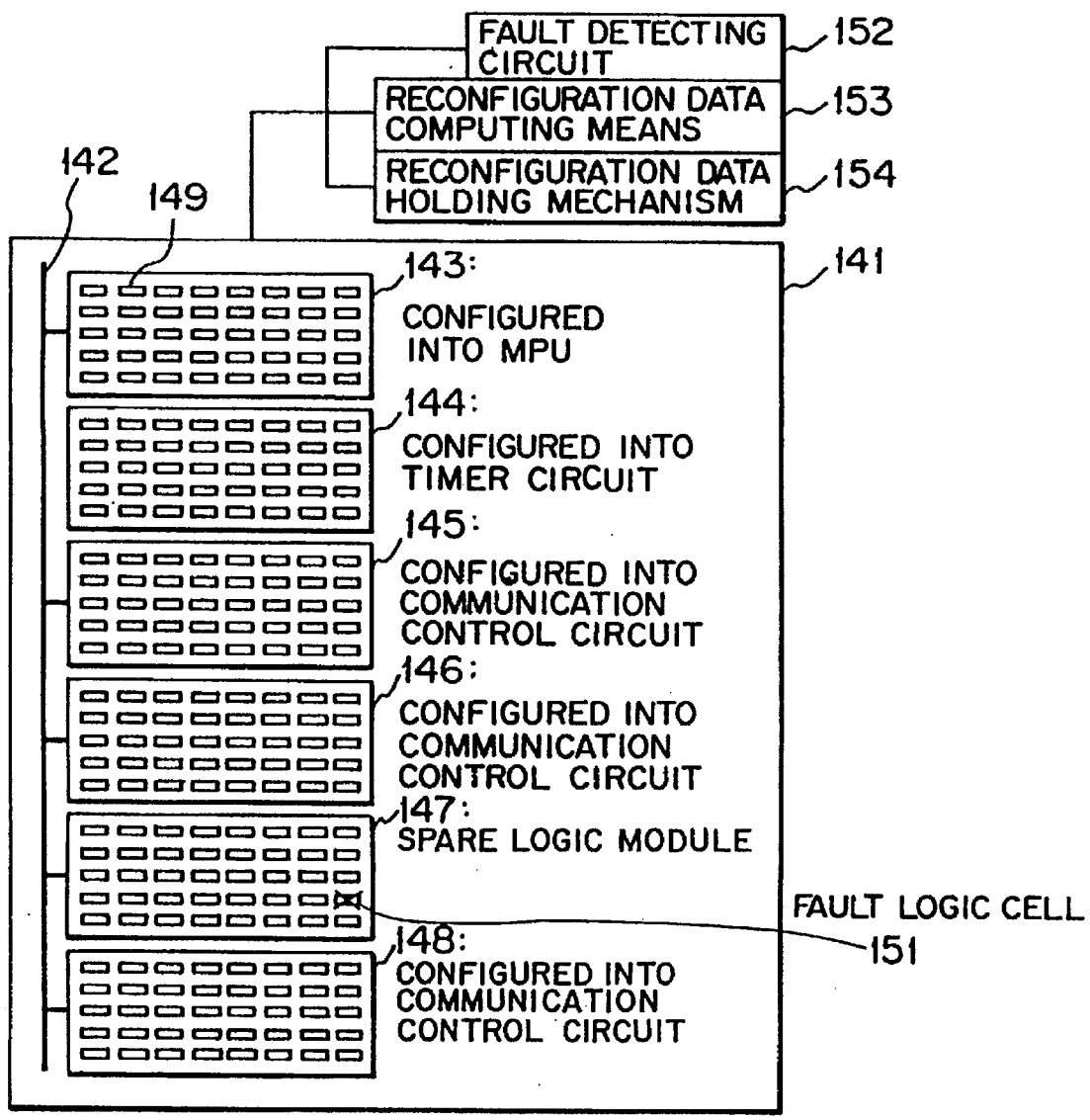
FIG. 29 is a block diagram showing the main portion of the information processing apparatus with self-repair function according to the ninth embodiment of the present invention.
Figure 30:
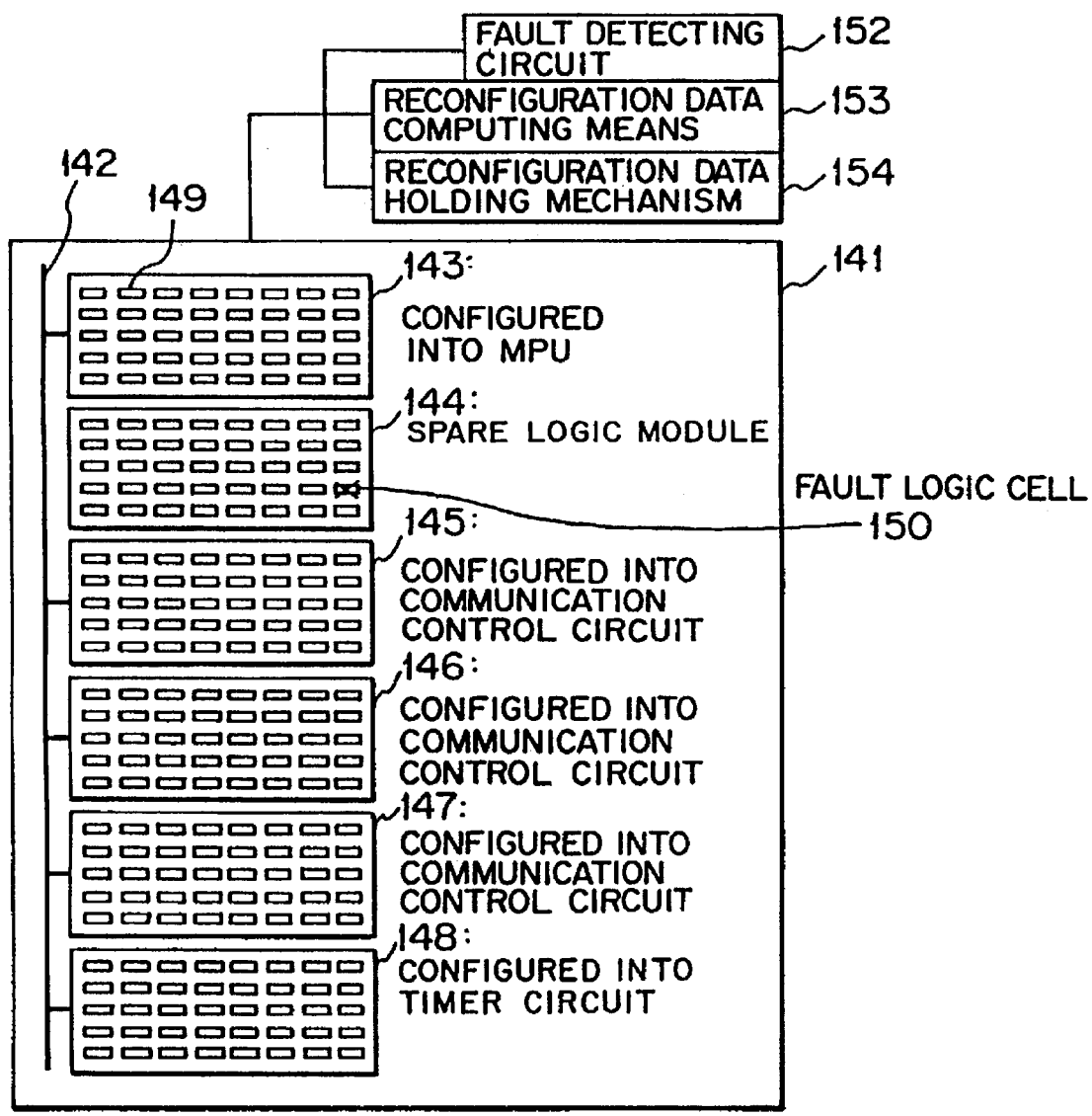
FIG. 30 is a block diagram showing the main portion of the information processing apparatus with self-repair function according to the ninth embodiment of the present invention.
Figure 31:
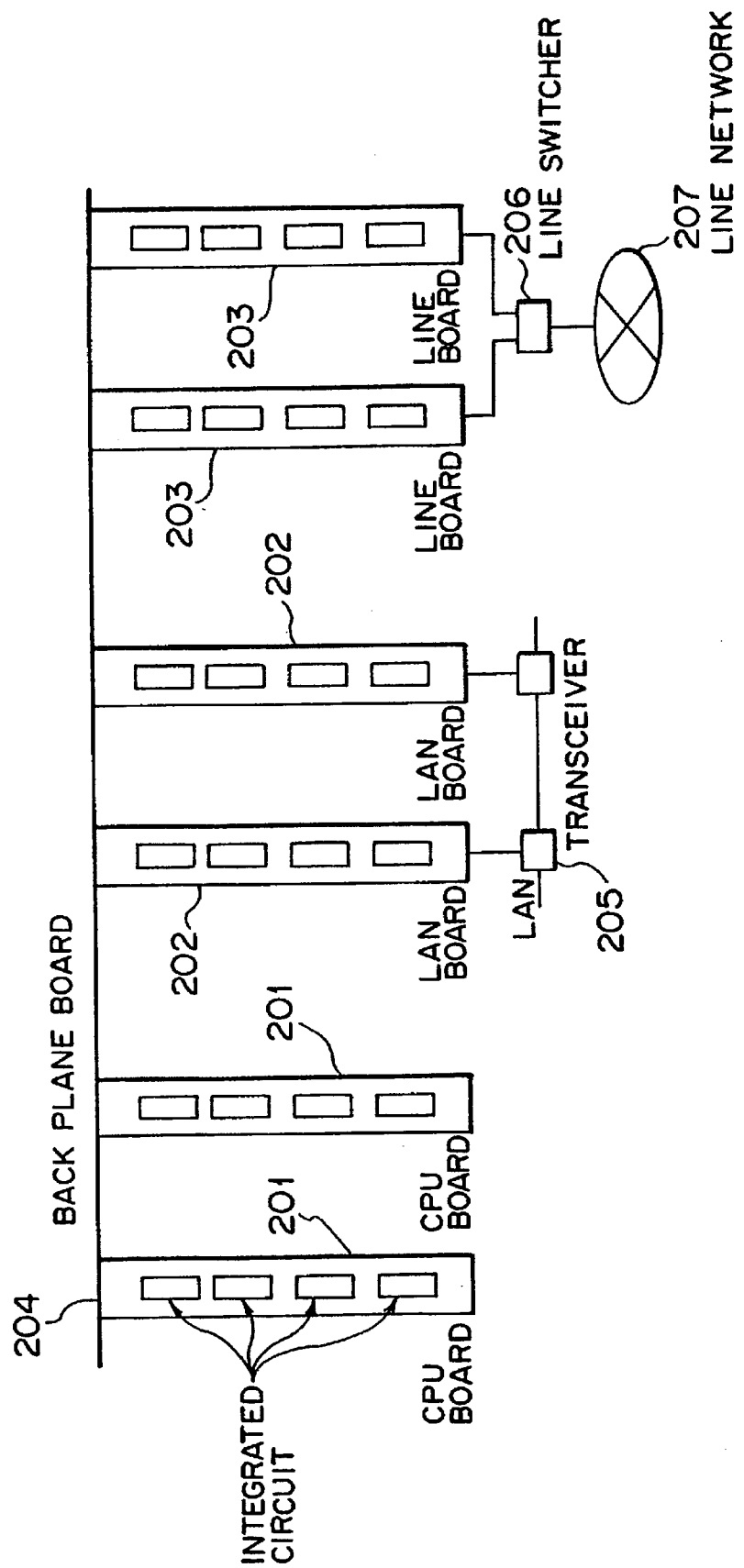
FIG. 31 is a block diagram showing an information processing apparatus with self-repair function.

FIGS. 28 to 30 are diagrams showing the information processing apparatus with self-repair function according to the ninth embodiment of the present invention. Unlike the second embodiment, the information processing apparatus of the present embodiment includes a spare logic module (spare logic processing unit) in addition to plural logic modules (logic processing units). The spare logic module is previously configured to have the same configuration as that of a specific logic module.

In FIG. 28, numeral 141 represents an integrated circuit (FPGA). The integrated circuit 141 is formed of plural reconstructible logic cells 149. The integrated circuit 141 includes plural logic modules 143 to 147 connected via the bus 142, and the spare logic module 148 formed of spare logic cells not connected to the bus 142.

Each FPGA is formed of plural logic cells. The logic module 143 functions as a microprocessor. Similarly, the logic module 144 functions as a timer circuit. The logic modules 145 to 147 function as communication control circuits, respectively.

The logic module 148 is previously formed so as to act as a communication control circuit. The integrated circuit 141 is occupied largely with the region for the communication control circuit. Hence it is predicted that the logic module formed in the communication control circuit tend to be troubled most frequently due to a faulty logic cell.

The integrated circuit 141 are connected to the fault detecting circuit 152 that detects a fault in the logic modules 143 to 148, a reconfiguration data holding mechanism 154 that holds logic circuit configuration data in each logic module, and the reconfiguration data computing means 153 that calculates reconfiguration data, based on logic circuit configuration data.

The logic forming element diagnosis means that diagnoses a faulty logic cell in a faulty logic module and a reconfiguring mechanism that reconfigures based on reconfiguration data calculated by the reconfiguration data computing means 153 are omitted from the figures.

In the information processing apparatus with self-repair function according to the ninth embodiment of the present invention, when the logic cell 151 in the logic module 147, formed as a communication control circuit, for example, is troubled as shown in FIG. 28, the logic module 148, shown in FIG. 29, previously formed to act as a communication control unit, is connected to the bus 142, whereby the communication control circuit can recover from the fault state.

The troubled logic module 147 is reconstructed so as to operate as a communication control circuit and stands by in preparation for the next possible fault occurrence, as a spare logic module. In this case, since the faulty logic cell 151 cannot be used, the reconfiguration data computing means 153 calculates reconfiguration data, except the faulty logic cell 151, so as to reconstruct the logic module 147.

Like the second embodiment, if a fault occurs, for example, in the logic cell 150 inside the logic module 144 formed as a timer circuit, shown in FIG. 28, the logic module 148 acting as a spare logic circuit is reconstructed as a timer circuit, as shown in FIG. 30. Thus the fault is removed.

That is, since the logic module 148 functions as a communication control circuit at the fault occurrence time of the logic cell 150, the reconfiguration data computing means 153 calculates reconfiguration data, based on data held in the reconfiguration data holding function 154. The reconfiguration mechanism (not shown) reconfigures so as to configure the logic module 148 as a timer circuit, according to the resultant reconfiguration data.

The fault logic module 144 is reconstructed so as to act as a communication control circuit to stand by for the next possible fault occurrence, as a spare logic module. The fault logic cell 150 is in a disabled state. Hence the reconfiguration data computing means 153 calculates the reconfiguration data, without considering the logic cell 150, to reconstruct the logic module 144.

According to the present invention, in the information processing apparatus with self-repair function, which includes plural logic modules 143 to 147, the spare logic module 148 is previously constructed so as to have the same logic configuration as that of a specific logic module among the plural logic modules 143 to 147. Hence if a fault occurs in a logic module having the same function as that of the spare logic module previously formed, the system recovery time can be shortened, whereby the system processing speed can be improved.

In this case, the reconfiguration data computing means 153 may reconstruct the faulty logic module 144 acting as the timer circuit with the previous fault history.

According to the present embodiment, where a logic sell in the logic module 144, acting as a timer circuit, is troubled, the logic module 148 can remove the fault in the same manner as that in the second embodiment. However, the present invention should not be limited only to the above embodiment.

According to the manner in the first embodiment, the reconfiguration data computing means 153 calculates reconfiguration data using the spare logic cell arranged in the logic module 144, instead of the logic module 148, to reconfigure the logic module 144.

What is claimed is:

1. An information apparatus comprising:

a plurality of logic processing units, each logic processing unit being a logic circuit realizing a predetermined function, said logic circuit comprising a plurality of logic forming elements;

at least one spare unit comprising a plurality of configurable logic forming elements;

data holding means for holding logic circuit forming data of each of said logic processing units;

fault detecting means for detecting a fault occurrence in each of said logic processing units; and reconfiguring means for reading said logic circuit forming data of the logic processing unit in which said fault detecting means detected a fault occurrence and for reconfiguring at least one of the plurality of configurable logic forming elements in said spare unit, based on said logic circuit forming data, so as to form a logic circuit similar to said logic processing unit having the fault occurrence.

2. The information processing apparatus according to claim 1 further comprising:

logic forming element diagnosis means for diagnosing a fault causing logic forming element in a logic processing unit in which said fault detecting means has detected a fault occurrence;

whereby a spare logic processing unit is formed of the logic forming elements other than the detected fault causing logic forming element.

3. The information processing apparatus according to claim 1, wherein said at least one spare unit is configured as a logic circuit similar to a logic circuit in a specific logic processing unit selected from among the plurality of logic processing units.

4. The information processing apparatus according to claim 1, further comprising memory means for storing substitution information representing that a spare unit is being used instead of a logic processing unit, whereby said spare unit is used instead of said logic processing unit, based on the substitution information, when the information processing apparatus is switched on or reset.

5. The information processing apparatus according to claim 1, further comprising power supply inhibiting means for inhibiting power supply to any of an unused spare units and any unused logic processing units after a fault occurrence.

6. The information processing apparatus according to claim 1, wherein said fault detecting means and said reconfiguring means are arranged in each of said plurality of logic processing units; and said data holding means and said fault logic element diagnosis means are arranged in common in each of said logic processing units.

7. The information processing apparatus according to claim 1, wherein said logic forming element comprises a logic cell, said logic cell being a minimum element for forming a logic circuit.

8. The information processing apparatus according to claim 7, wherein said logic processing units are formed of a logic module comprising a plurality of logic cells and said spare units are formed of a logic module comprising a plurality of logic cells.

9. The information processing apparatus according to claim 7, wherein said logic processing units each comprise an integrated circuit including plural logic modules, each of said logic modules comprising a plurality of logic cells; and said spare units each comprise an integrated circuit including plural logic modules, each of said logic module comprising a plurality of logic cells.

10. The information processing apparatus according to claim 7, wherein said logic processing units each comprise a unit formed of plural integrated circuits, each of said integrated circuits formed of plural logic modules comprising a plurality of logic cells; and said spare units each comprise a unit formed of plural integrated circuits, each of said integrated circuits formed of plural logic modules comprising a plurality of logic cells.

11. The information processing apparatus according to claim 7, wherein said logic processing units each comprise an information processor including plural units each formed of plural integrated circuits, each of said integrated circuit including plural logic modules comprising a plurality of logic cells; and said spare units each comprise an information processor comprising a plurality of units each formed of a plurality of integrated circuits, each of said integrated circuit including plural logic modules comprising a plurality of logic cells.

12. An information processing apparatus comprising:

a logic processing unit formed as a logic circuit for realizing a predetermined function, said logic circuit comprising a plurality of logic forming elements;

a plurality of spare logic forming elements;

data holding means for holding logic circuit forming data of said logic processing unit;

fault detecting means for detecting a fault occurrence in said logic processing unit;

fault logic element diagnosis means for diagnosing a logic forming element related to the fault occurrence in said fault logic processing unit;

reconfiguring means for reading said logic circuit forming data regarding said logic processing unit when said fault detecting means detects a fault occurrence in said logic processing unit and for calculating reconfiguration data, based on said logic circuit forming data, to reconfigure said spare logic forming elements with the logic forming elements, except the logic forming element diagnosed by said fault logic element diagnosis mean, based on said reconfiguration data calculated by said reconfiguration data computing means, so as to have the same function as that of said logic processing unit.

13. The information processing apparatus according to claim 12, further comprising memory means for storing substitution information representing that said spare logic forming element is being used instead of said logic forming element; and said spare logic forming element is used instead of said fault logic forming element, based on the substitution information when the information processing apparatus is switched on or reset.

14. The information processing apparatus according to claim 12, further comprising power supply inhibiting means for inhibiting power supply to unused spare logic forming elements and unused logic forming elements.

15. The information processing apparatus according to claim 12, further comprising reporting means for reporting when the number of unused logic forming elements in said logic processing unit is less than a standard value.

16. The information processing apparatus according to claim 12, wherein said plurality of spare logic forming elements are previously arranged in said logic processing unit.

17. The information processing apparatus according to claim 12, wherein said spare logic forming elements are added from outside said logic forming unit, according to reconfiguration information calculated by means of said reconfiguration data computing means.

18. The information processing apparatus according to claim 12, wherein the logic forming elements in said logic processing units, except any logic processing unit diagnosed as faulty, are used as spare logic forming elements.

19. The information processing apparatus according to claim 12, further comprising at least one spare logic processing unit that can be reconfigured as a logic circuit, using a plurality of logic forming elements, to reproduce a predetermined function of a specified logic processing unit; and said reconfiguring means reads logic circuit configuration data regarding a logic processing unit disabled in a reconfiguration operation when said reconfiguration data computing means cannot calculate reconfiguration data, whereby said spare logic processing unit is reconfigured to have the same function as that of said logic processing unit that cannot be reconfigured.

20. The information processing apparatus according to claim 19, wherein said spare logic processing unit is previously configured as a logic circuit similar to a specific logic processing unit from among plural logic processing units.

21. The information processing apparatus according to claim 19, further comprising memory means for storing substitution information representing that said spare logic processing unit is being used instead of said logic processing unit disabled in the reconfiguration operation; and said spare logic processing unit is used instead of said disabled logic processing unit, based on the information regarding the substitution of said spare logic processing unit, when a power source is switched on or reset after the substitution of said spare logic processing unit.

22. The information processing apparatus according to claim 19, further comprising power supply inhibiting means for inhibiting power supply to unused spare logic processing unit and unused logic processing units after the reconfiguration operation.

23. The information processing apparatus according to claim 12, wherein said fault detecting means and said reconfiguring means are arranged in each of a plurality of logic processing units; and said data holding means, said fault logic element diagnosis means, and said reconfiguration data computing means are arranged in common in said logic processing units.

24. The information processing apparatus according to claim 12, wherein said logic forming element comprising a logic cell, said logic cell being the minimum element for forming a logic circuit, and said spare logic forming element comprising a logic cell.

25. The information processing apparatus according to claim 24, wherein said logic processing unit is formed of a logic module formed of a plurality of logic cells.

26. The information processing apparatus according to claim 24, wherein said logic processing unit comprises an integrated circuit including a plurality of logic modules, said logic module formed of a plurality of logic cells.

27. The information processing apparatus according to claim 24, wherein said logic processing unit comprises a unit formed of a plurality of integrated circuits, each of said integrated circuits formed of a plurality of logic modules each formed of a plurality of logic cells.

28. The information processing apparatus according to claim 24, wherein said logic processing unit comprises an information processor including a plurality of units each formed of a plurality of integrated circuits, each of said integrated circuit including a plurality of logic modules each formed of a plurality of logic cells.

\* \* \* \* \*